US008284793B2

(12) United States Patent
Santhanam

(10) Patent No.: US 8,284,793 B2
(45) Date of Patent: Oct. 9, 2012

(54) BACKOFF CONTROL FOR ACCESS PROBE TRANSMISSION IN COMMUNICATION SYSTEMS

(75) Inventor: Arvind Vardarajan Santhanam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1334 days.

(21) Appl. No.: 11/364,148

(22) Filed: Feb. 27, 2006

(65) Prior Publication Data

US 2007/0201377 A1   Aug. 30, 2007

(51) Int. Cl.
*H04L 12/413* (2006.01)
*H04L 12/28* (2006.01)
*H04W 72/00* (2009.01)

(52) U.S. Cl. ............. 370/447; 370/431; 455/453

(58) Field of Classification Search .......... 370/241, 370/252, 445, 447, 448, 431, 229, 230; 455/403, 455/422.1, 423, 39, 68, 69, 450, 453; 709/230, 709/232, 235
See application file for complete search history.

(56) References Cited

U.S. PATENT DOCUMENTS

| | | | |
|---|---|---|---|
| 5,544,196 A | 8/1996 | Tiedemann, Jr. et al. | |
| 5,838,904 A | 11/1998 | Rostoker et al. | |
| 6,118,997 A | 9/2000 | Kim et al. | |
| 6,404,750 B1 | 6/2002 | Wicker et al. | |
| 6,445,925 B1 | 9/2002 | Kwon et al. | |
| 6,631,121 B1 | 10/2003 | Yoon | |
| 6,674,765 B1 | 1/2004 | Chuah et al. | |
| 6,965,942 B1 | 11/2005 | Young et al. | |
| 7,082,472 B1 * | 7/2006 | Feder et al. | 709/235 |
| 7,272,400 B1 | 9/2007 | Othmer | |
| 7,313,105 B1 | 12/2007 | Lo et al. | |
| 7,664,031 B2 | 2/2010 | Davis | |
| 7,813,753 B2 | 10/2010 | Santhanam | |
| 8,046,017 B2 | 10/2011 | Kludt et al. | |
| 2002/0136929 A1 * | 9/2002 | Oikawa et al. | 428/694 TM |
| 2002/0142791 A1 | 10/2002 | Chen et al. | |
| 2002/0154653 A1 | 10/2002 | Benveniste | |
| 2002/0163929 A1 | 11/2002 | Li et al. | |
| 2003/0027580 A1 | 2/2003 | Goodjohn et al. | |
| 2003/0087645 A1 * | 5/2003 | Kim et al. | 455/453 |
| 2003/0189948 A1 * | 10/2003 | Sashihara | 370/445 |
| 2003/0199252 A1 * | 10/2003 | Tiedemann et al. | 455/69 |
| 2004/0127233 A1 * | 7/2004 | Harris et al. | 455/458 |
| 2004/0192371 A1 | 9/2004 | Zhao et al. | |

(Continued)

FOREIGN PATENT DOCUMENTS

EP        0994603        4/2000

(Continued)

OTHER PUBLICATIONS

Non-Final Office Action issued in U.S. Appl. No. 11/609,500, May 21, 2009.

(Continued)

*Primary Examiner* — Ricky Ngo
*Assistant Examiner* — Paul H Masur
(74) *Attorney, Agent, or Firm* — Raphael Freiwirth

(57) ABSTRACT

A random backoff time can be determined and the transmission of an initial access probe can be delayed for the random backoff time. A backoff interval can be determined based on channel load, wherein the backoff interval defines a range from which the random backoff time is selected.

24 Claims, 16 Drawing Sheets

U.S. PATENT DOCUMENTS

| | | | |
|---|---|---|---|
| 2004/0264423 A1 | 12/2004 | Ginzburg et al. | |
| 2005/0054288 A1 | 3/2005 | Agarwal | |
| 2005/0250511 A1 | 11/2005 | Xiao et al. | |
| 2005/0271076 A1 | 12/2005 | Ganti et al. | |
| 2006/0039281 A1* | 2/2006 | Benveniste | 370/230 |
| 2006/0148485 A1 | 7/2006 | Kangas et al. | |
| 2007/0153719 A1 | 7/2007 | Gopal | |
| 2007/0165665 A1* | 7/2007 | Gaur et al. | 370/445 |
| 2008/0071874 A1 | 3/2008 | Roodman et al. | |
| 2008/0137680 A1 | 6/2008 | Santhanam | |
| 2010/0034177 A1 | 2/2010 | Santhanam | |
| 2010/0080114 A1 | 4/2010 | Ratnam et al. | |
| 2011/0026409 A1 | 2/2011 | Hu et al. | |

FOREIGN PATENT DOCUMENTS

| | | |
|---|---|---|
| EP | 1024606 | 8/2000 |
| EP | 1538810 | 6/2005 |
| JP | 2002232424 A | 8/2002 |
| JP | 2008541515 A | 11/2008 |
| WO | 9914869 | 3/1999 |
| WO | 02054622 | 7/2002 |
| WO | WO03017621 | 2/2003 |

OTHER PUBLICATIONS

Non-Final Office Action issued in U.S. Appl. No. 11/363,670, May 21, 2009.

International Search Report, PCT-US07/062913, International Search Authority—European Patent Office, Jul. 2, 2007.

Written Opinion, PCT-US07/062913, International Search Authority—European Patent Office, Jul. 2, 2007.

International Preliminary Report of Patentability, PCT-US06/021384, International Search Authority—European Patent Office, Jun. 11, 2008.

International Search Report and Written Opinion—PCT/US2007/062907—ISA/EPO—Jul. 26, 2007.

* cited by examiner

BACKOFF CONTROL FOR ACCESS PROBE TRANSMISSION IN COMMUNICATION SYSTEMS

BACKGROUND OF THE INVENTION

1. Field

The present invention generally relates to communication systems. More particularly, the invention relates to backoff control in communication systems that use access probes.

2. Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xRTT, "1x", and 1xEV-DO standards, "1XEV", for example) or TD-SCDMA.

In wireless communication systems mobile terminals or access terminals receive signals from fixed position base stations (also referred to as cell sites or cells) that support communication links or service within particular geographic regions adjacent to or surrounding the base stations. In order to aid in providing coverage, each cell is often sub-divided into multiple sectors, each corresponding to a smaller service area or geographic region. An array or series of base stations placed adjacent to each other form a communication system capable of servicing a number of system users, over a larger region.

Typically, each mobile terminal monitors a control channel that can be used to exchange messages between the mobile terminal and the base station. The control channel is used to transmit system/overhead messages, whereas traffic channels are typically used for substantive communication (e.g., voice and data) to and from the mobile terminal. For example, the control channel can be used to establish traffic channels, control power levels, and the like, as is known in the art. Generally, there are two types of power control for the reverse link, open-loop and closed-loop power control. The open-loop power control typically occurs prior to the mobile terminal establishing contact with a base station. The closed-loop control occurs after the mobile and the base station are in communication and the base station can measure the received power levels and feedback power level adjustments to the mobile terminal.

In the open loop condition, the reverse link power for an initial communication signal (e.g., access probe) from the mobile terminal to the base station can be determined by monitoring specialized signals from a base station or access point. For example, in CDMA systems a pilot signal can be use to estimate the channel condition and then determine a power estimate for transmitting back to the base station. The accuracy of the channel conditions and power estimation can greatly impact performance of the system, particularly in terms of latency of the system. For example, 1x and 1XEV systems will transmit an access probe at a first power level based on a power control algorithm. If the first access attempt does not succeed, then the probe is resent at increasingly higher power levels, until it is successful or the power level maximum is reached.

The existing open-loop power control algorithm used to transmit access probes over the Access Channel in CDMA2000 1X-A and 1xEVDO networks tend to be prone to inaccuracies and can result in underestimation of transmit power for access probes. This leads to an increased loss rate of access probes over the Access Channel, particularly on the first access attempt. Accordingly, errors in the determination of the power level for the first transmission can lead to a high rate of unsuccessful first access attempts, which can cause increased system latency as the probes are resent. By limiting retransmissions of the access probes, the latency incurred by access probes can be reduced.

Another cause of failed access attempts is collision between access probes. Collisions occur when more than one mobile terminal attempts to send an access probe on the same Access Channel in the same sector. Because of the interference cause by the competing signals, the base station may not successfully receive the access probes. Accordingly, collisions are another factor that can impact the latency of a communication system. To address the problem of collisions, some conventional systems will generate a random backoff time to prevent collisions on subsequent retransmissions. However, conventional systems do not address potential collisions with the first access probe. Accordingly, system latency can also be impacted by collisions on the initial access probe attempt.

SUMMARY OF THE EXEMPLARY EMBODIMENTS

Exemplary embodiments of the present invention are directed to systems and methods for improved access probe backoff control in a communication system.

Accordingly, an embodiment of the invention can include a method comprising: determining a backoff interval based on channel load; determining a random backoff time, wherein the backoff interval defines a range from which the random backoff time is selected; and delaying the transmission of an initial access probe for the random backoff time.

Another embodiment of the invention can include an apparatus comprising: logic configured to determine a random backoff time; logic configured to delay the transmission of an initial access probe for the random backoff time; and logic configured to determine a backoff interval based on channel load, wherein the backoff interval defines a range from which the random backoff time is selected.

Another embodiment of the invention can include a group communication method comprising: transmitting a channel load estimate; receiving the channel load estimate; determining a backoff interval based on the channel load estimate; determining a random backoff time, wherein the backoff interval defines a range from which the random backoff time is selected; and delaying the transmission of an initial access probe for the random backoff time.

Another embodiment of the invention can include a communication system comprising: logic configured to transmit a channel load estimate; logic configured to receive the channel load estimate; logic configured to determine a backoff interval based on the channel load estimate; logic configured to determine a random backoff time, wherein the backoff interval defines a range from which the random backoff time is selected; and logic configured to delay the transmission of an initial access probe for the random backoff time.

Another embodiment of the invention can include an access terminal comprising: means for determining a backoff interval based on channel load; means for determining a random backoff time, wherein the backoff interval defines a range from which the random backoff time is selected; and means for delaying the transmission of an initial access probe for the random backoff time.

Another embodiment of the invention can include a computer readable media embodying a method in a wireless communication system, the method comprising: determining a backoff interval based on channel load; determining a random backoff time, wherein the backoff interval defines a range from which the random backoff time is selected; and delaying the transmission of an initial access probe for the random backoff time.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
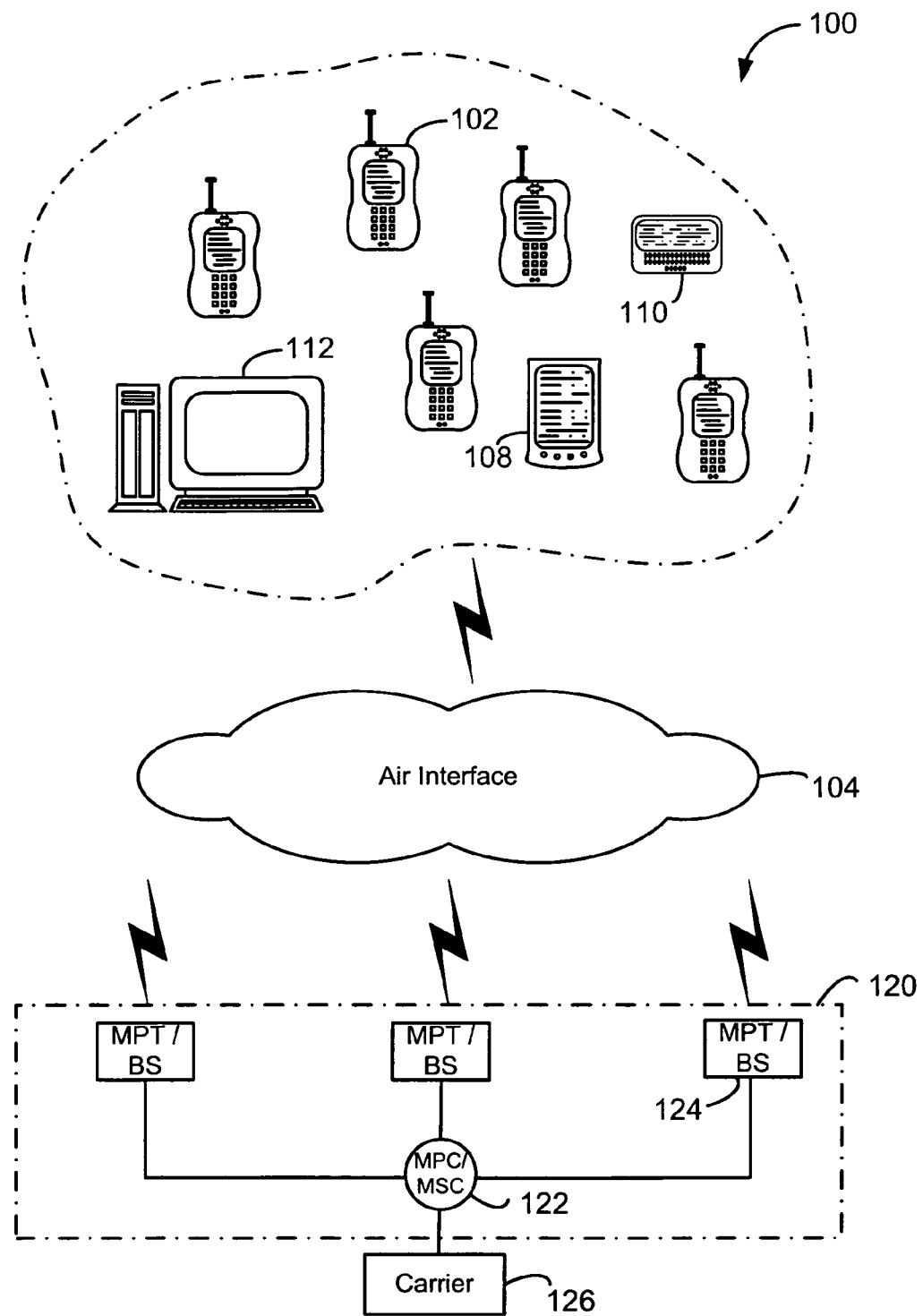
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) base station transceivers (BTS), base stations (BS) or more generally access points. An access terminal transmits and receives data packets through one or more modem pool transceivers to an HDR base station controller, referred to as a modem pool controller (MPC), base station controller (BSC) and/or mobile switching center (MSC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein generally the term traffic channel can refer to either a forward or reverse traffic channel.

Additionally, although exemplary embodiments of the invention are described in terms of a wireless system and specific technologies such as CDMA 1x and 1XEV system, those skilled in the art will appreciate that the invention is not limited to the illustrated systems. For example, embodiments of the invention can include any system that transmits an access probe from an access terminal to an access network to establish a traffic channel with the access network. Those skilled in the art will appreciate that signals transmitted over many mediums can be considered to have channel parameters and may utilize access probes to establish traffic channels. For example, signals over wireline systems, such as copper wire, coaxial cable, fiber optic cables, and the like have channel parameters that can be affected by transmission/modulation frequency, modulation technique, noise sources, cross talk, medium characteristics, and the like.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably. Further as used herein the terms "access point", "modem pool transceiver (MPT)", "base transceiver station (BTS)", "base station (BS)" and like variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, wireless network carrier 126, a core network, the Internet, and/or other remote servers.

The RAN 120 controls messages (typically sent as data packets) sent to a MPC/MSC 122. The carrier network 126 may communicate with the MPC/MSC 122 by a network, the Internet and/or a public switched telephone network (PSTN). Alternatively, the MPC/MSC 122 may connect directly to the Internet or external network. Typically, the network or Internet connection between the carrier network 126 and the MPC/MSC 122 transfers data, and the PSTN transfers voice information. The MPC/MSC 122 can be connected to multiple base stations (BS) or modem pool transceivers (MPT) 124. In a similar manner to the carrier network, the MPC/MSC 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, MPC/MSC 122 and other components may form the RAN 120, as is known in the art. However, alternate configurations may also be used and the invention is not limited to the configuration illustrated.

Figure 2:
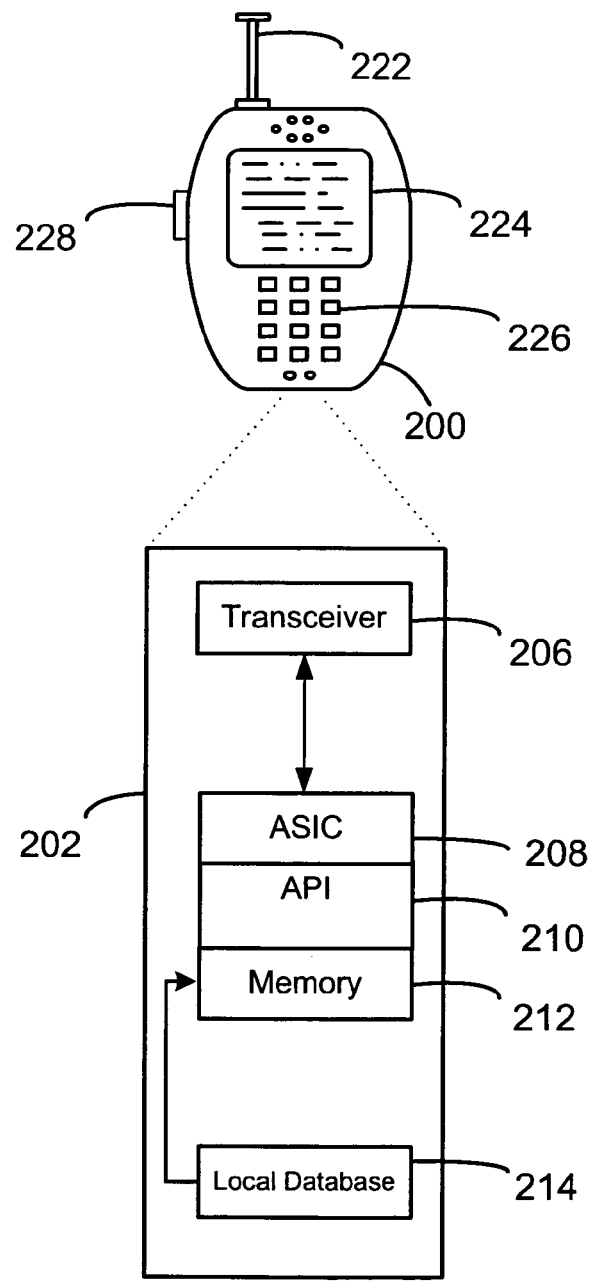
FIG. 2 is an illustration of an access terminal in accordance with at least one embodiment of the invention.

Referring to FIG. 2, the access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein, related to access probe backoff. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 2 are to be considered merely illustrative and the invention is not limited to the illustrated features or arrangement.

As used herein "access terminal" includes, for example, one or more processing circuits executing resident configured logic, where such computing devices include, for example, microprocessors, digital signal processors (DSPs), microcontrollers, or any suitable combination of hardware, software and/or firmware containing processors and logic configured to at least perform the operations described herein. Some examples of access terminals or wireless devices which may be used in accordance with embodiments of the present invention include cellular telephones or other wireless communication units, personal digital assistants (PDAs), paging devices, handheld navigation devices, handheld gaming devices, music or video content download units, and other like wireless communication devices.

The wireless communication between the access terminal 102 and the RAN 120 can be based on different technologies, such as code division multiple access (CDMA), time division multiple access (TDMA), frequency division multiple access (FDMA), the Global System for Mobile Communications (GSM), or other protocols that may be used in a wireless communications network or a data communications network. The data communication is typically between the client device 102, MPT/BS 124, and MPC/MSC 122. The MPC/MSC 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN 120 after traffic channels have been established.

Initial Random Backoff

As previously discussed conventional systems do not perform a random backoff during the initial transmission of the access probe. Accordingly, the probability of collisions on the initial access probe is greater than in subsequent access attempts. Additionally, to further enhance the probability of the access probe being successfully completed, the random backoff can be optimized based on the channel load. Both of these aspects and other aspects of embodiments of the invention will be discussed in the following description.

Collisions can occur on the Access Channel whenever two or more access probes start transmitting at the same time. This can be particularly probable in a geographically dense call region (e.g., in a group communications network). For example, in a group communications network, a large number of access terminals may be simultaneously paged and attempt to access the network, such as in CDMA2000 1x when a large number of access terminals transmit the 8026 Page Response following a jump-to-hyperspace operation. In general the jump-to-hyperspace operations refers to 1x access terminals that get a page message attempt to get synchronized with respect to each other within a time window (e.g., in a 80 msec. window of time) when transmitting the page response message.

The dependence of collision probability on the load on the Access Channel and the random backoff interval can be determined in closed-form. These results can be used in the development of an adaptive backoff algorithm that ensures successful delivery of access probes over the Access Channel.

Figure 3A:
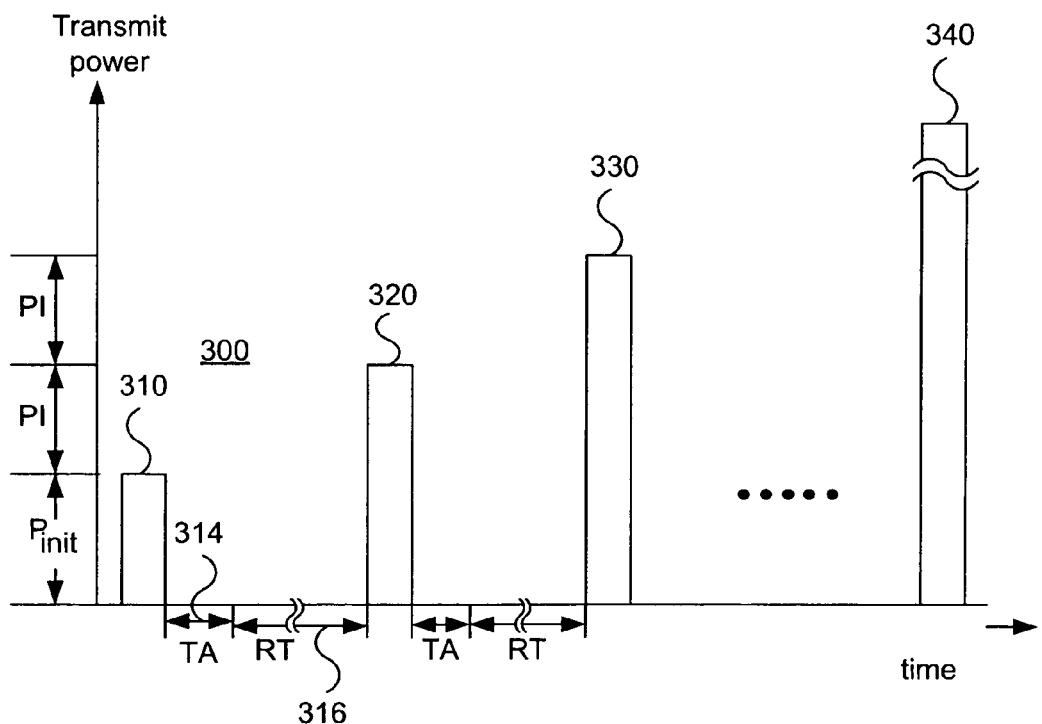
FIGS. 3A and 3B are illustrations of access probe sequences for various transmissions.

For comparison to embodiments of the present invention, a conventional sequence of access probes 300 is illustrated in FIG. 3. The first probe 310 is transmitted at an initial power (Pinit) during a first Access Channel slot 312. The probe waits for acknowledgement from the access point (e.g., base station) or for an acknowledgement timeout 314 to occur. Then, a random backoff time is determined before the next access probe 320 is sent. As illustrated the second access probe 320 and subsequent access probes 330 and 340, will be sent using increasingly higher transmit powers until an acknowledgement is received, a maximum power is reached or the access process timeout occurs.

Figure 3B:
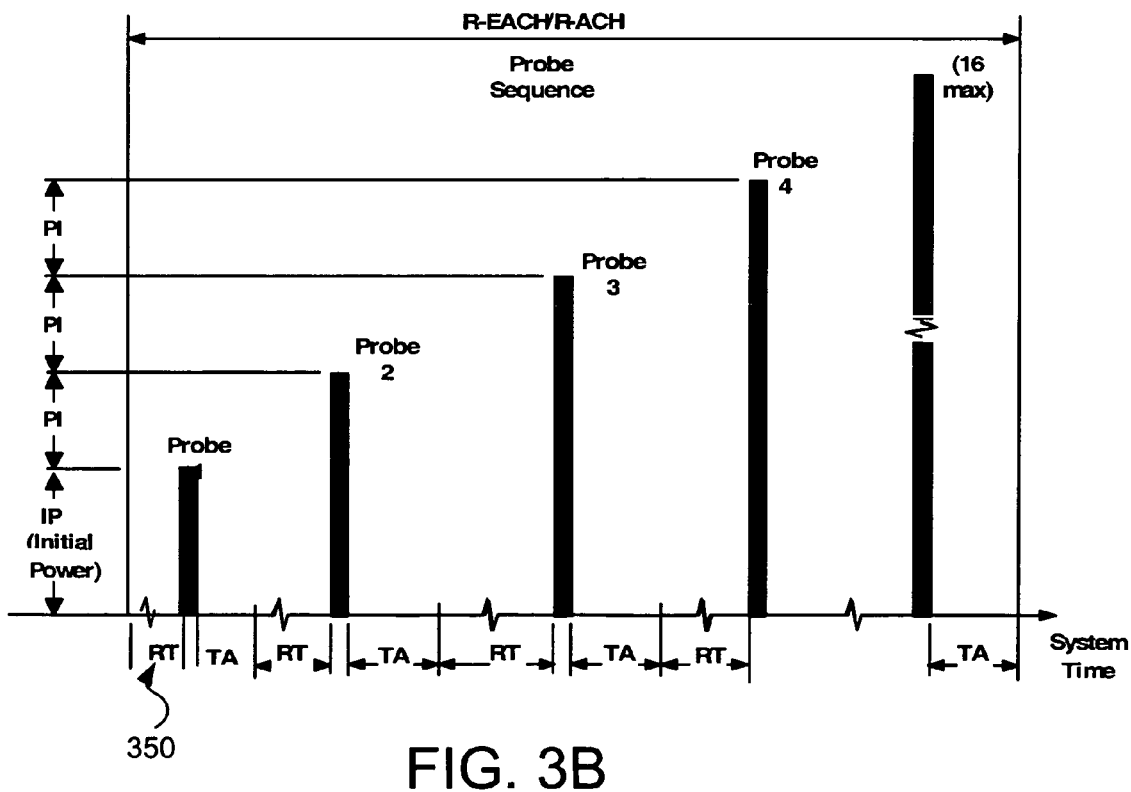

A reference diagram that illustrates an exemplary access procedure over the Access Channel in accordance with at least one embodiment of the invention is illustrated in FIG. 3B. As illustrated, an exemplary access procedure for embodiments of the invention differs from the standard-specified procedure in one aspect in that a random backoff operation 350 is performed even before the transmission of the first access probe.

For example, let N denote the number of access terminals that have a probe to transmit over the Access Channel at time t=0. Each access terminal randomly defers its transmission by RT access cycle durations where $0 \leq RT \leq D-1$. The random backoff time RT can take integer values and can be uniformly distributed in the interval [0, D-1]. In one embodiment, D can be fixed to a pre-specified value. In this case, two probes will only collide with each other if their random backoff times RT are the same on the first access attempt. Collisions can also occur on subsequent access attempts if the access probes transmissions start at the same time.

Accordingly, the probability of M probes colliding in exactly K slots can be denoted as $P_K^M(N,D)$. The number of collisions in each of these K slots can be given as $l=\{i_1, i_2, \ldots i_K\}$, where $i_1+i_2+\ldots i_K=M$. Then, $$P_K^M(N, D) = \sum_{i_1, i_2, \ldots i_K} \frac{M!}{i_1! i_2! \ldots i_K!} \frac{N!}{M!(N-M)!} \frac{D!}{K!(D-K-(N-M))!} \frac{1}{D^N}$$

Or Simply, $$P_K^M(N, D) = \sum_{i_1, i_2, \ldots i_K} \frac{1}{K!} \frac{N!}{i_1! i_2! \ldots i_K!(N-M)!} \frac{D!}{(D-K-(N-M))!} \frac{1}{D^N}$$

For a collision to take place in a slot, at least two probes have to be transmitted. Therefore, $i_K \geq 2$ for all $k=[1, K]$ and $K \leq M/2$. Further details regarding the derivation of the collision probability over the Access Channel can be found at the end of the Detailed Description.

The foregoing illustration results if the BTS is only able to decode exactly one probe per access cycle duration, then a collision will occur if two or more probes start transmissions simultaneously (e.g., $i_K \geq 2$ for all $k=[1, K]$ and $K \leq M/2$). However, if the BTS is able to decode exactly J access probes transmitted in the same access cycle duration, then all we need to do is add the constraint: $i_K \geq J+1$ for all $k=[1, K]$ and $K \leq M/(J+1)$ in the determination of $P_K^M(N,D)$.

In the following section, the impact on delay in successful delivery of an access probe as a function of the load on the Access Channel is analyzed for varying values of the random backoff duration. These results provide valuable insight to the development of the backoff algorithm, in accordance with some embodiments of the invention.

To facilitate an understanding of the following disclosure definitions for various terms used therein will be provided. For example, the delay incurred by the first successful access probe out of N access probes is denoted by Minimum_Delay. Note that the minimum delay will impact latency sensitive applications. The delay incurred by the last successful access probe out of N access probes is denoted by Maximum_Delay. The 50th and 80th percentile delay are defined as the delay experienced by the (N/2) and (0.8N) successful access probe, respectively. The terms ProbeBackoff and D may be used interchangeably, where ProbeBackoff=D-1.

Additionally, the following variable terms will be used in the equations presented herein.

N denotes the number of access terminals that have a probe to transmit over the Access Channel at time t=0. Each access terminal randomly defers its transmission by RT access cycle durations where $0 \leq RT \leq D-1$. The random backoff time RT takes integer values and is uniformly distributed in the interval [0, D−1].

$D_{max}$ denotes a system-specific pre-determined value that upper-bounds the value of D.

K denotes the number of access cycle durations in which a "collision event" takes place when N access probes contend to transmit over the Access Channel. A "collision event" is said to occur whenever two or more access probes start transmitting in the same access cycle duration.

M denotes the number of access probes that collide in K "collision events". Accordingly, $0 \leq M \leq N$.

R denotes the minimum number of successful access probes on the first access attempt when N probes that are synchronized with respect to each other contend for transmissions over the Access Channel.

$P_0$ denotes the minimum probability of success of R access probes on the first access attempt when N access probes contend to transmit on the Access Channel.

$L_{max}$ denotes a pre-determined value that constrains a delay metric that defines the success of one or more access probes of a total of N access probes.

$P_K^M(N,D)$ denotes the probability of M probes colliding in K collision events when N access probes begin access procedures at the same time and defer their probe transmission by a random amount of time (in the interval [0, D−1] Access Cycle durations) prior to the first access attempt.

Further in the following illustration the following configuration parameters are assumed for the Access Channel.

Access cycle duration=16 slots, Preamble=4 slots.

Size of the access probe=16 slots (26.67 msec).

Probes that are lost due to access collisions will be retransmitted one (1) access cycle duration milliseconds (ACMPT-ProbeTimeout=128) after the end of probe transmission. This is based on the smallest possible value as specified in the 1xEVDO Rev. A.

Persistence test is bypassed (i.e., threshold to pass is set to 0).

The message error rate due to channel induced errors is based on empirical data and simulations.

The delay incurred in transmitting access probes over the Access Channel can be analyzed as a function of the load on the Access Channel for different settings of D. The delay incurred by the first successful access probe out of N access probes is denoted by Minimum_Delay. The delay incurred by the last successful access probe out of N access probes is denoted by Maximum_Delay.

Figure 4A:
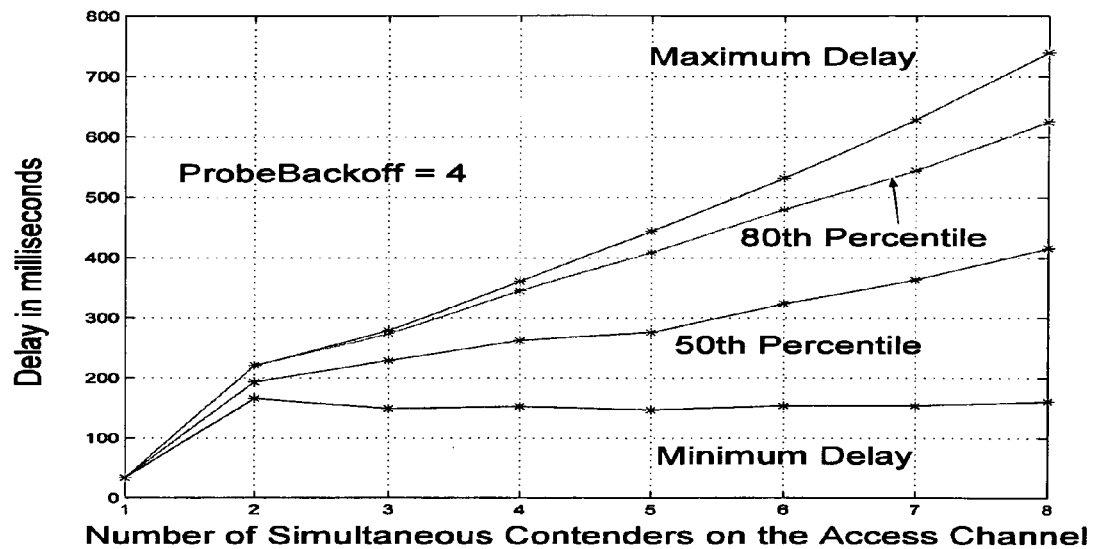
FIGS. 4A and 4B are comparisons of the number of simultaneous contenders on the Access Channel vs. delay for various conditions.

FIG. 4A illustrates the Minimum_Delay, Maximum_Delay, the 50th percentile and the 80th percentile delay as a function of N for a default setting in a 1xEVDO network. However, the invention is not limited to these settings. For example, in another setting for access probes, the Access Channel overrides persistence and performs a random backoff operation only for retransmissions, i.e., D=1 prior to the first access attempt and D=5 prior to retransmissions.

Each data point in FIG. 4A was computed by averaging over 500 runs. For the case of N=1, the Minimum_Delay=33.33 msec which is the lowest possible value since the preamble+payload is equal to 20 slots. The Minimum_Delay is approximately 150~160 msec for all values of $N \geq 2$. This is because in the default setting, the first access attempt always results in a collision because there is no random backoff before the first attempt. Since the first successful probe is generally successful in the second access attempt, the average value of Minimum_Delay=2*(Preamble+Payload)+ACM-ProbeTimeout+0.5*ProbeBackoff*AccessCycleDuration+ Alignment with nearest cycle boundary, which can be determined as:

Minimum_Delay=2*33.33+26.67+0.5*4*26.67+ 12*1.67=166 msec.

Alignment with the nearest Access Cycle boundary can result in an additional delay of 12 slots. Additionally, the average delay incurred as a result of performing a random backoff is not always equal to 0.5*ProbeBackoff*AccessCycleDuration slots. It can be considered a function of the backoff interval length and is typically less than the value of 0.5*ProbeBackoff*AccessCycleDuration for D>N.

Figure 4B:
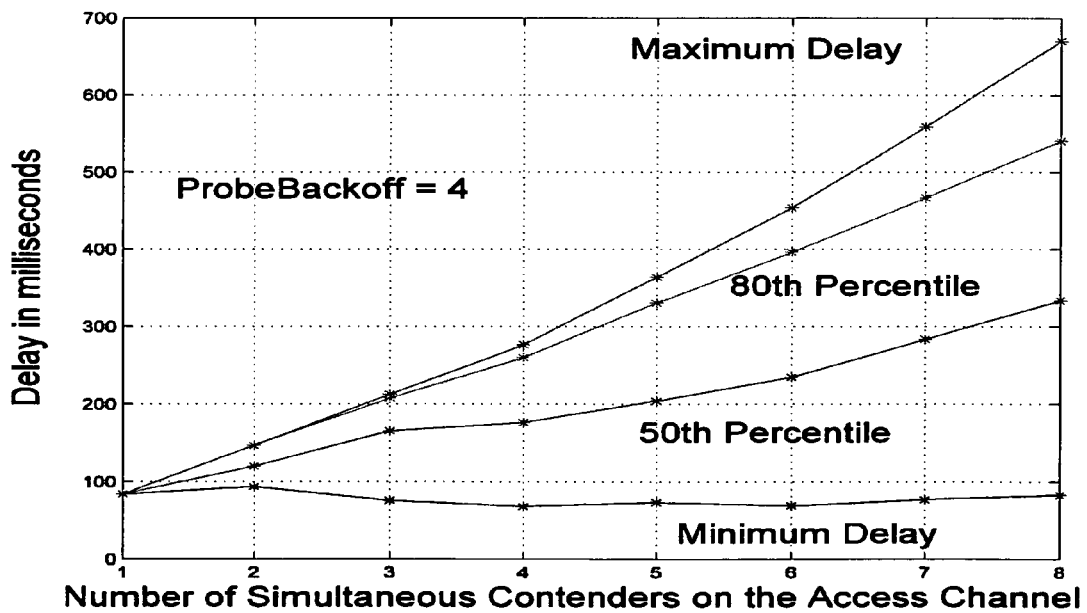

FIG. 4B illustrates the Minimum_Delay, Maximum_Delay and the 50th and 80th percentile delay as a function of N for an alternate setting wherein D=5 prior to each access attempts (including retransmissions). Each data point in FIG. 4B was also computed by averaging over 500 runs. For the case of N=1, the Minimum_Delay=33.33+56 msec. This value is higher than the corresponding value for the default setting because performing a random backoff prior to the first access attempt can result in an additional delay of 0.5*Probe-Backoff (=32) slots which is equal to 53.34 msec. Accordingly, performing a random backoff for the case of N=1 is not advantageous in terms of delay.

However for all values of $N \geq 2$, we find that the first successful access probe incurs an average delay of 87 msec which is significantly less than 166 msec. This is because performing a random backoff operation prior to the first access attempt results in a significant decrease in Access Channel collision probability and as a result at least one access probe is generally successful in the first access attempt. Following the first access attempt, both these experiments (FIGS. 4A and 4B) depict identical behavior as Probe-Backoff=4 for all retransmissions in either case.

Figure 10A:
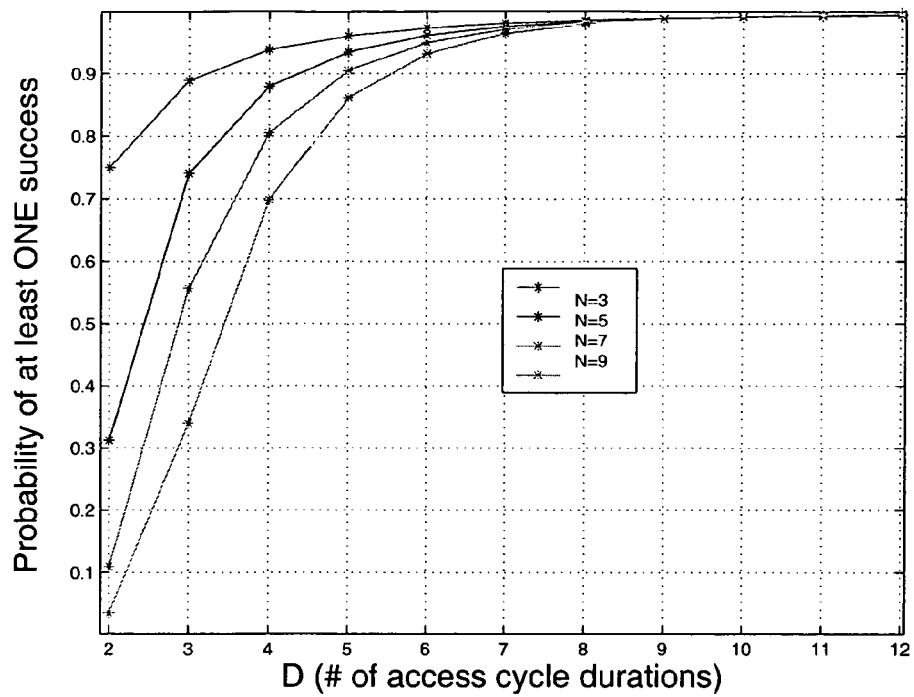
FIGS. 10A and 10B are graphs of the probe backoff interval vs. the probability of one successful probe transmission for various conditions.
Figure 10B:
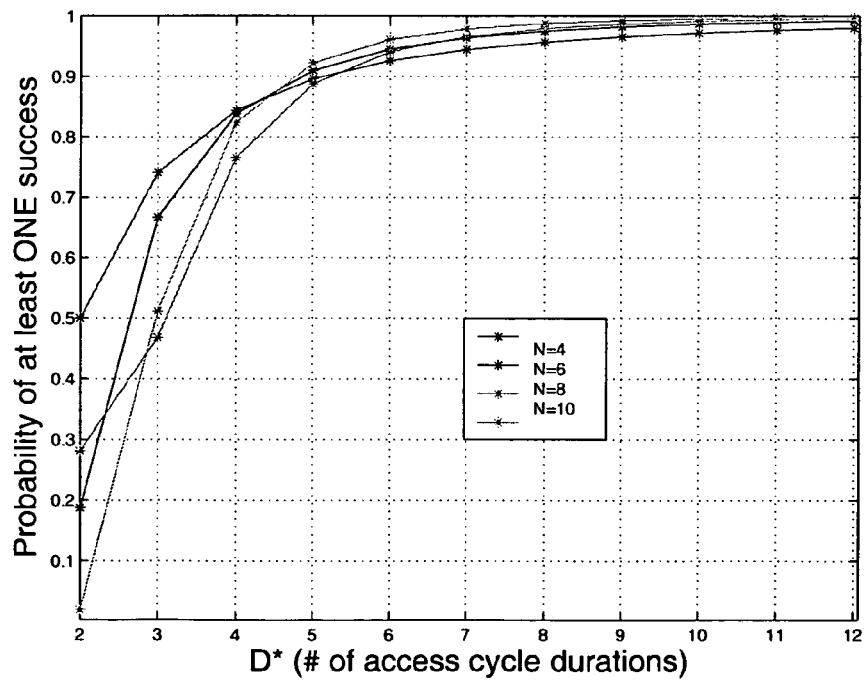

The Minimum_Delay value directly affects the initial latency of the system. Accordingly, in latency sensitive applications, such as group communications, the initial latency should be minimized as much as possible. Additionally, for the group communications applications and other latency sensitive applications, the 50th percentile delay should be considered, as it can impact some target access terminals and cause loss of some initial media traffic. The 50th, 80th and the Maximum_Delay values are uniformly lower in FIG. 4B as compared to FIG. 4A for all values of $N \geq 2$. For example, for N=6, both the 50th and 80th percentile delay in figure FIGS. 10A and 10B is 112 msec lower than in FIG. 5. Accordingly, aspects of embodiments of the invention such as performing the random backoff procedure prior to the first access probe can yield significant reduction in delay.

Figure 5:
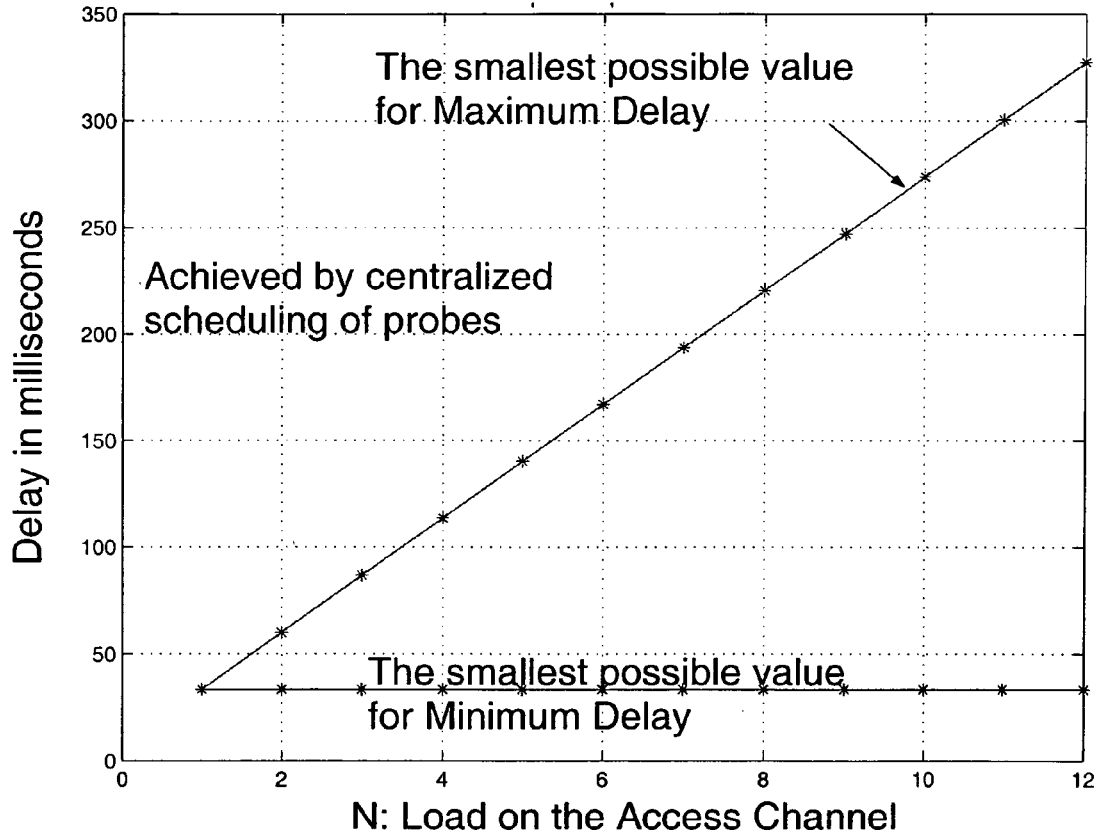
FIG. 5 is a graph illustrating the effect of load on the Access Channel on delay in the system.

Referring to FIG. 5, the minimum and maximum values of delay in transmitting N access probes are illustrated. Using FIG. 5, the best achievable delay (e.g., achieved by centralized scheduling) can be ascertained. For example, comparing the delay achieved in experiments 1 and 2 (FIGS. 4A and 4B) to the smallest possible value as shown in FIG. 5, the Minimum_Delay achieved in experiment 2 is approximately 2.6 times higher than the best possible value for all values of $N \geq 2$. The Maximum_Delay in experiment 2 is approximately 2.2 times its smallest possible value for large values of N. In fact, the 50th percentile delay in experiment 2 is very close to the smallest possible value of Maximum_Delay (in FIG. 5) for all values of N. The delay provisioned by the randomized backoff algorithm is within a factor of 2~2.5 of the theoretical lower bound.

Figure 6A:
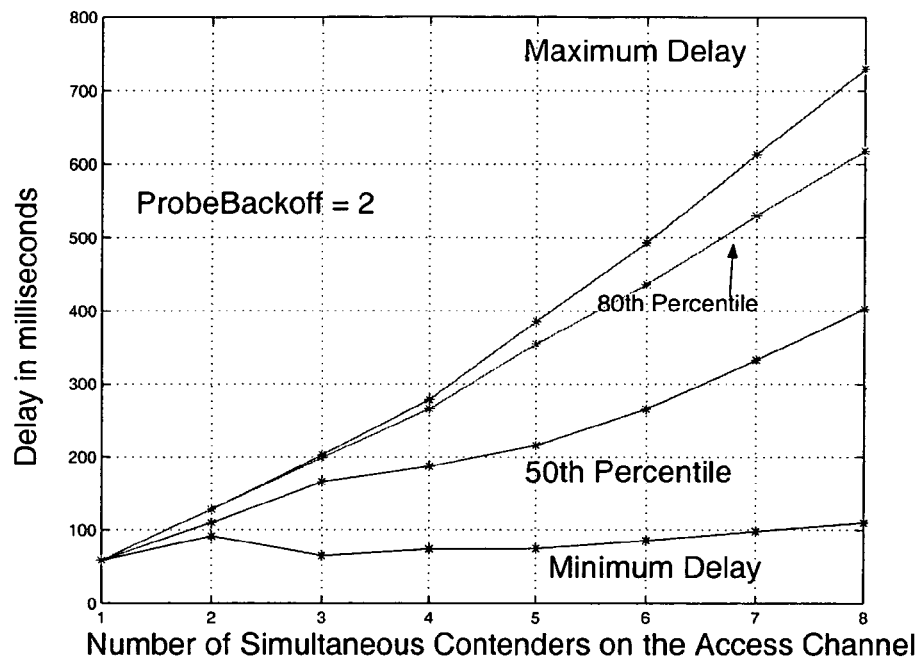
FIGS. 6A and 6B are comparisons of the number of simultaneous contenders on the Access Channel vs. delay for various conditions.
Figure 6B:
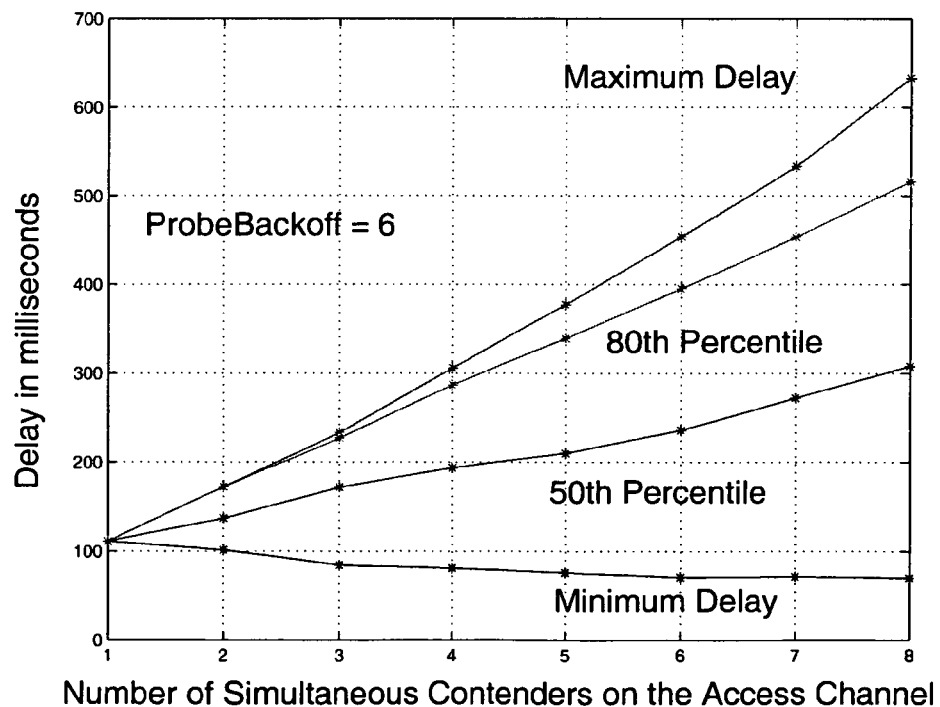

Referring to FIGS. 6A and 6B, the effect of the backoff delay interval [0, D−1] for D=3 and D=7, respectively, are illustrated. In order to understand the effect of delay on the backoff interval [0, D−1], simulations were run for alternate values of D, namely D=3 and D=7 with all other parameters being the same. The results in FIGS. 6A and 6B suggest that in order to minimize the Minimum_Delay, a lower value of D is necessary for low N and a higher value of D is needed for high N.

Figure 7A:
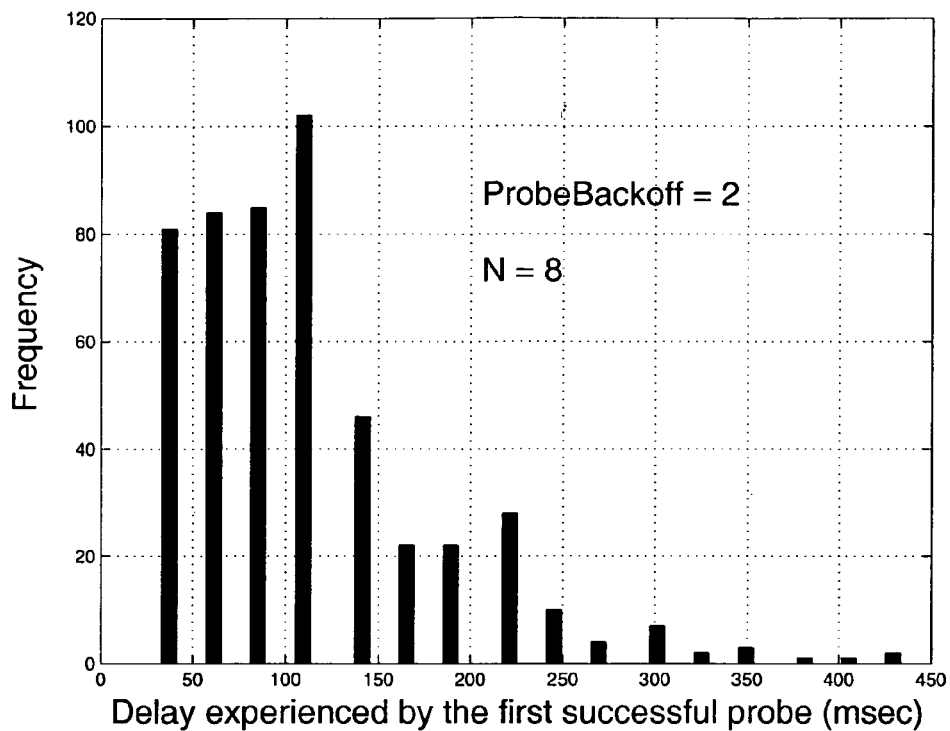
FIGS. 7A and 7B are histograms of the delay experienced by the first successful probe for various conditions.
Figure 7B:
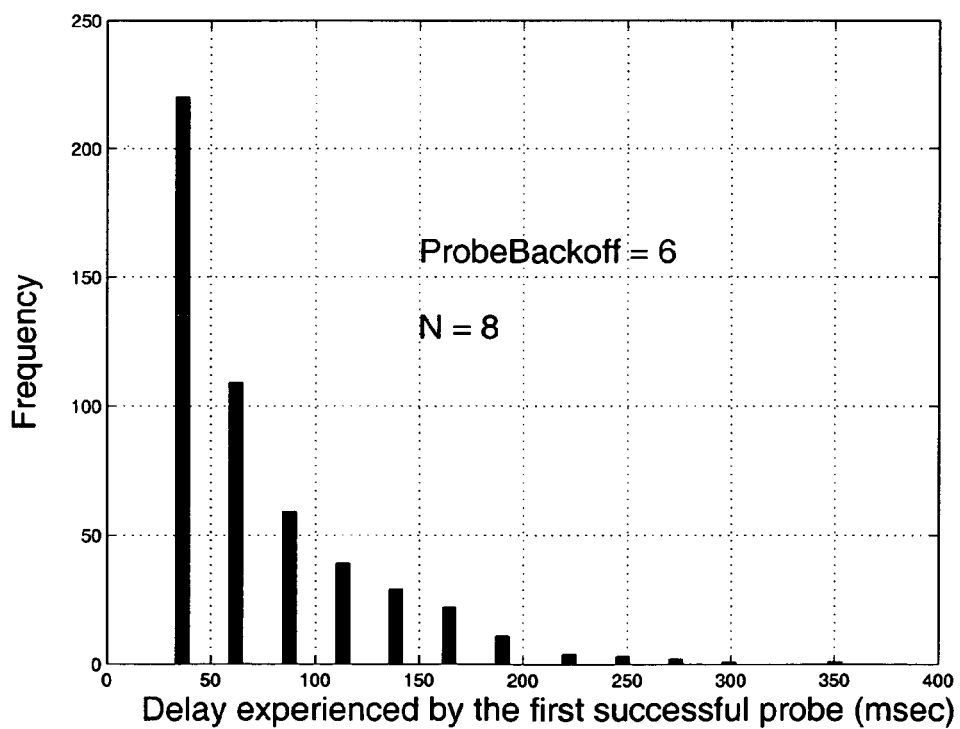

The delay distribution of the Minimum_Delay for D=3 and D=7 are illustrated in FIGS. 7A and 7B, respectively, for the case of N=8. As can be observed from these histograms, for D=3, the probability of transmitting at least one access probe is high and results in an average delay of approximately 2*33.34+26.67=93 msec. For the case of D=7, there is a very high probability that at least one access probe is successful on the first attempt. However, because of a large backoff interval ([0, 6] Access cycles), the delay incurred in transmitting the first access probe is much higher with an average delay of 87 msec for most values of N. The histograms of FIGS. 7A and 7B illustrate that a low value of D (e.g., 3) results in a high probability that at least one access probe can be transmitted successfully within a target value of 100 msec.

Figure 8A:
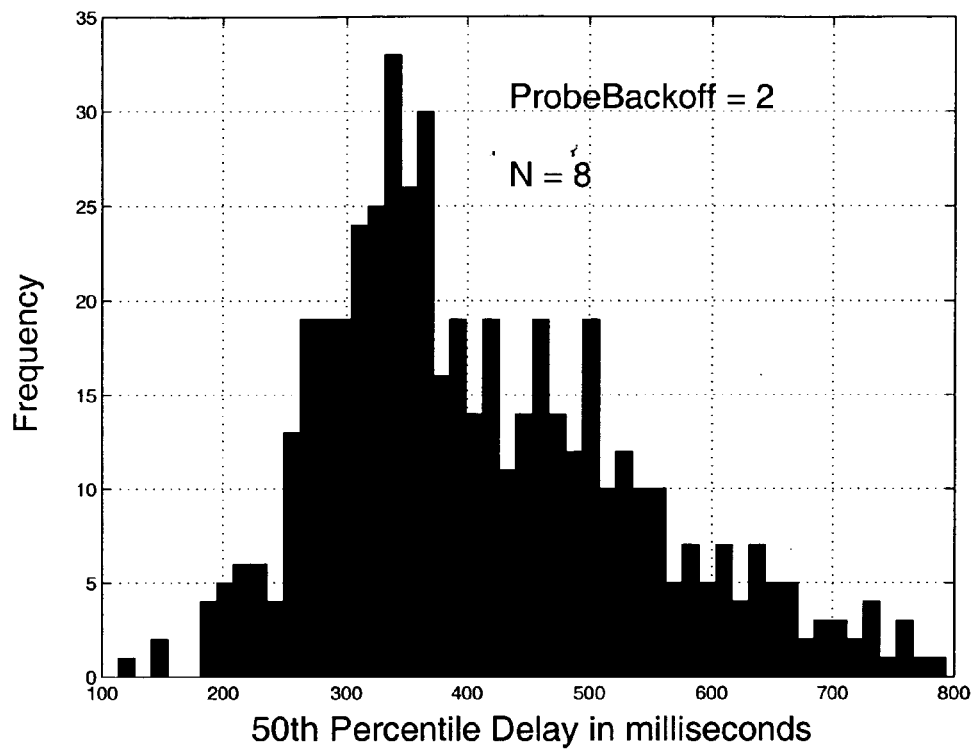
FIGS. 8A and 8B are histograms of the delay experienced by the $50^{th}$ percentile for various conditions.
Figure 8B:
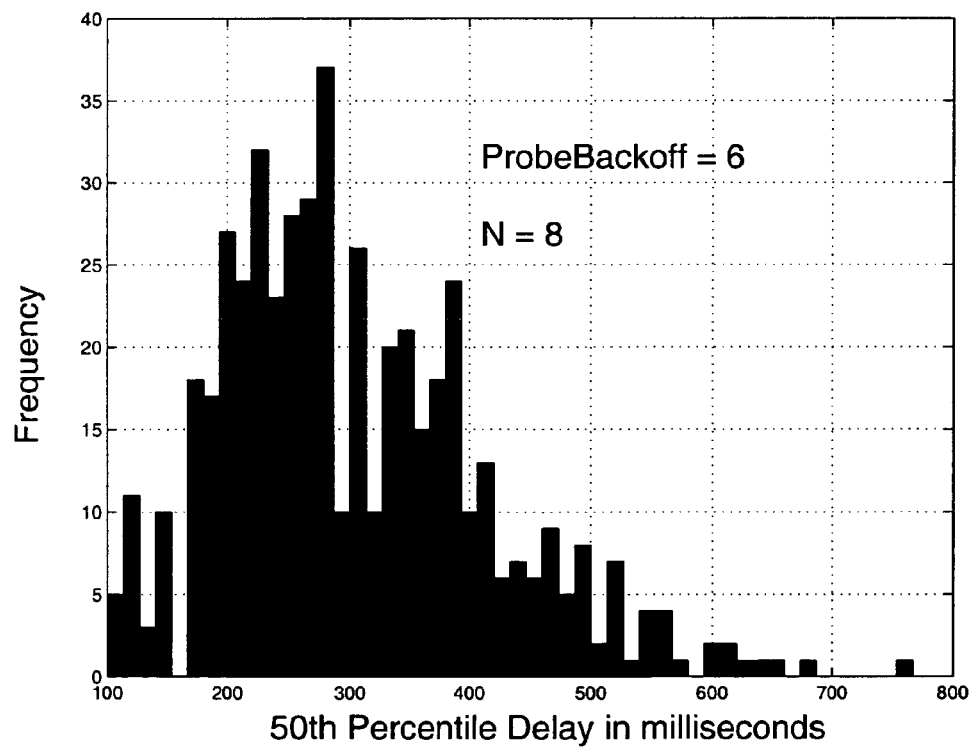

Additionally, as can be seen in FIGS. 6A and 6B, the 50th percentile delay is roughly the same for low values of N in FIGS. 6A and 6B, but is significantly lower in FIG. 6B, for high values of N. This can be attributed to a lower collision rate when ProbeBackoff is set to 7 as opposed to ProbeBackoff=3. For N=8. The 50th percentile delay for ProbeBackoff=6 is 100 msec lower than when ProbeBackoff=2. The delay distribution of the 50th percentile delay for D=3 and D=7 are plotted in FIGS. 8A and 8B, respectively, for the case of N=8.

Figure 9A:
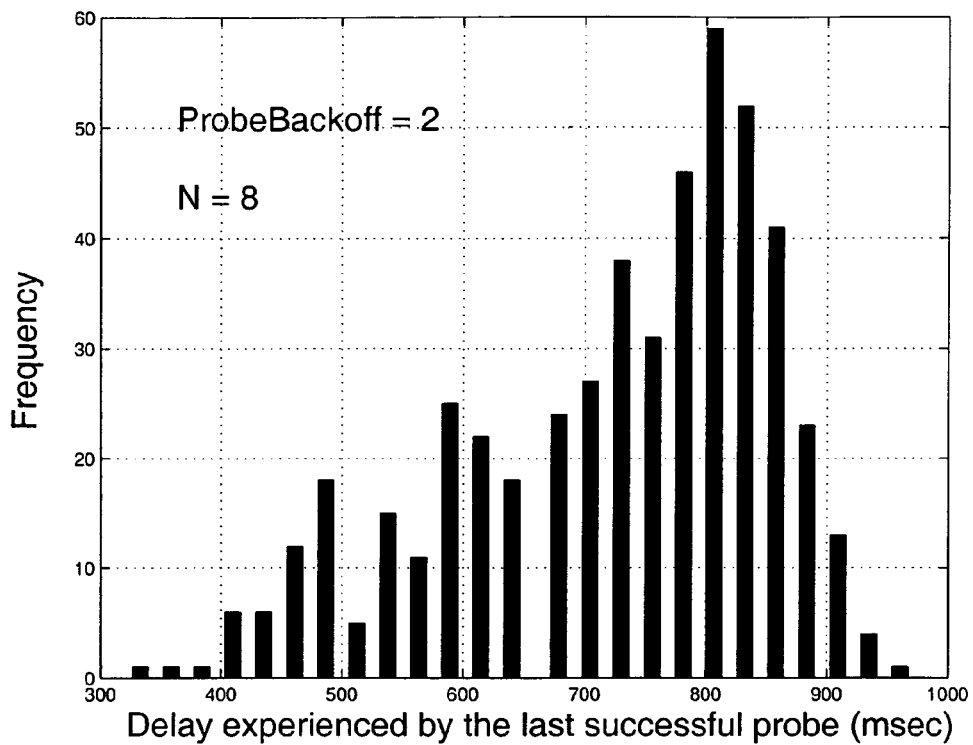
FIGS. 9A and 9B are histograms of the delay experienced by the last successful probe for various conditions.
Figure 9B:
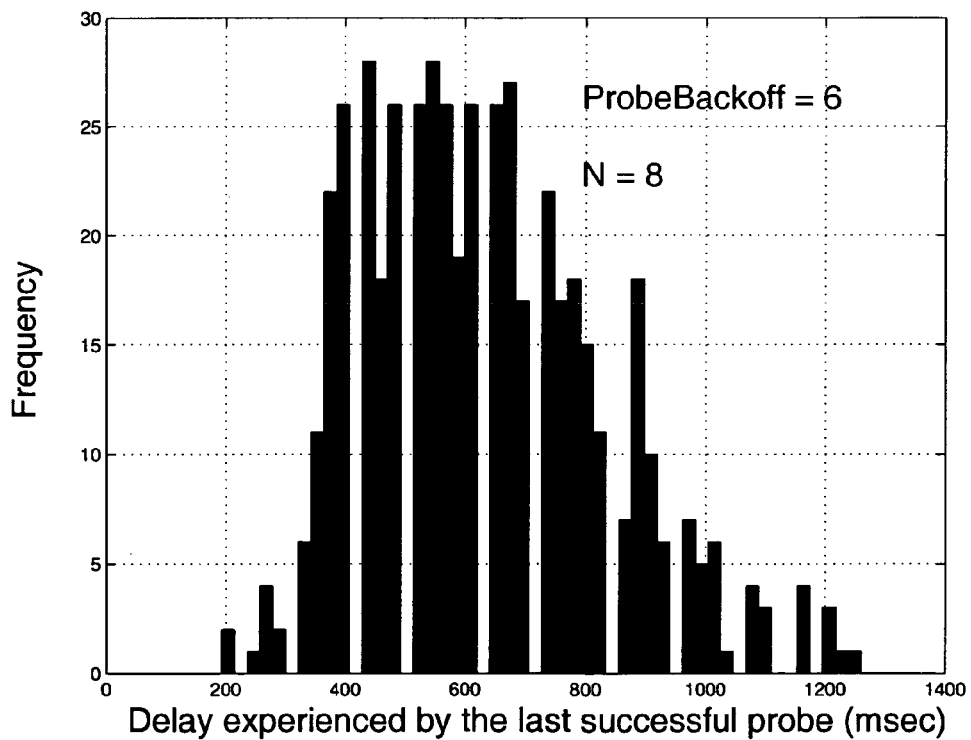

However, the Maximum_Delay for ProbeBackoff=6 is 100 msec and is not significantly lower than for the case when ProbeBackoff=2. For higher values of ProbeBackoff (e.g., 6), even a single collision can result in a large increase in delay because of the large backoff interval (6 Access cycles). Therefore, even though the collision rate is lower for ProbeBackoff=6, the delay incurred upon collisions is higher and as a result the Maximum_Delay tends to be high. However, it is still less than the corresponding value of Maximum_Delay for ProbeBackoff=2 for large values of N. The delay distribution of the Maximum_Delay for ProbeBackoff=2 and ProbeBackoff=6 are illustrated in FIGS. 9A and 9B, respectively, for the case of N=8.

Referring to FIGS. 10A and 10B, the probability of at least one successful access attempt is plotted against the ProbeBackoff for odd and even values of N, respectively. The lack of sensitivity of the Minimum_Delay curve with increasing N (for large D) can be corroborated by looking at the probability of at least one successful access attempt versus N. This probability is given by:

$$\text{Probability of at least one success} = 1 - \sum_{K=1}^{\lfloor \frac{N}{2} \rfloor} P_K^N(N, D).$$

The foregoing equation is used to generate FIGS. 10A and 10B.

From FIGS. 10A and 10B, it can be observed that setting D=5 (i.e. ProbeBackoff=4) will ensure that at least one access probe is successful among N access probe transmissions in the first access attempt 90% of the time regardless of the value of N in the range 2≦N≦10. Increasing D beyond 5 only yields marginal improvements in the success probability on the first access attempt. Setting D=5 can be considered to be one optimal predetermined value since it ensures success of at least one access probe with very high probability even for a wide range of values of N (i.e. 2≦N≦10). However, it must be noted that the average collision probability of an access probe will increase with increasing N for a given value of D.

Backoff Algorithm Based on Target Success Probability of Access Probe(s)

The above approach can be generalized to determine the probability of at least an arbitrary number of R successes, which is given by:

$$\text{Probability of at least } R \text{ success} = 1 - \sum_{M=N-R+1}^{N} \sum_{K=1}^{\lfloor \frac{M}{2} \rfloor} P_K^M(N, D).$$

Figure 11A:
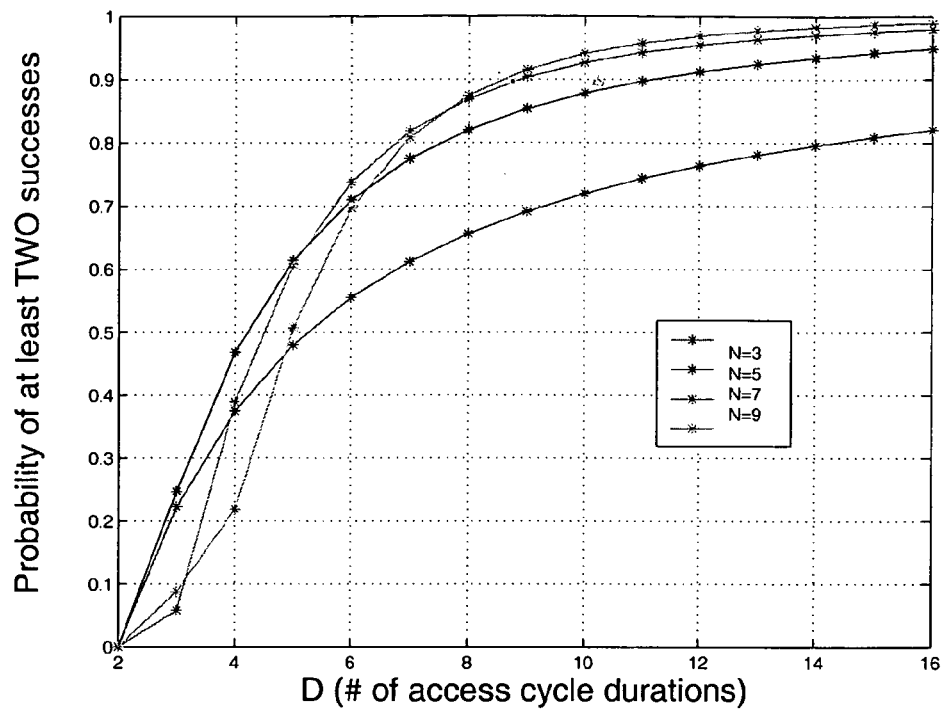
FIGS. 11A and 11B are graphs of the probe backoff interval vs. the probability of at least two successful probe transmissions for various conditions.
Figure 11B:
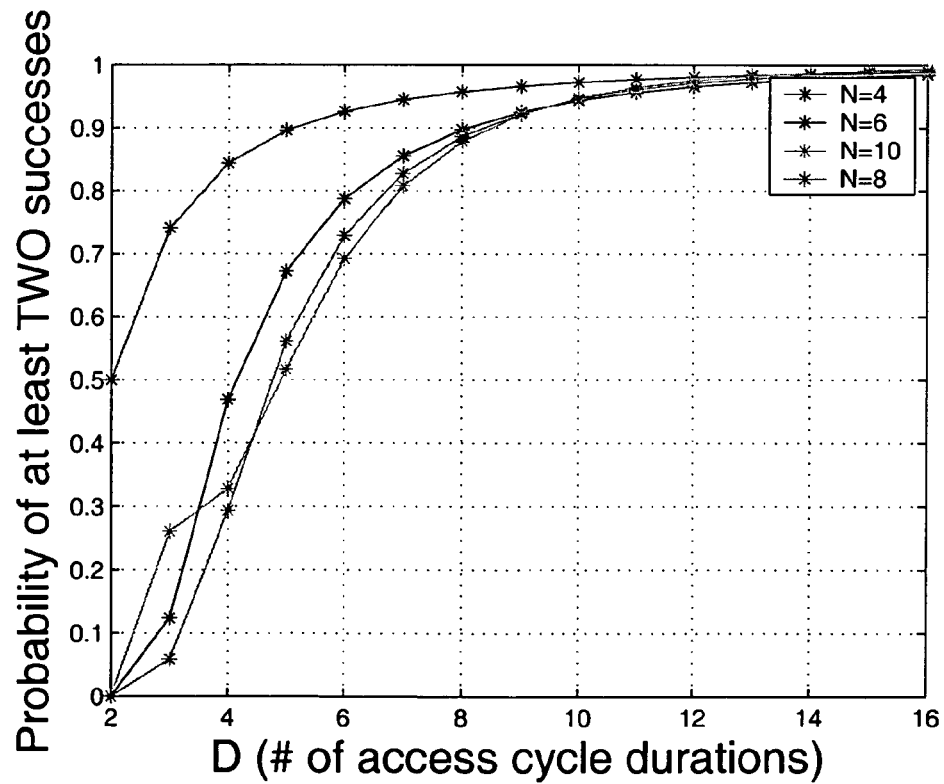

This probability is plotted as a function of D and N in FIGS. 11A and 11B for the case of R=2. It is noted that for small values of N, generally less than 6, slightly different behavior is observed for even and odd values of N.

As can be discerned from the foregoing figures and description, for any given value of D, the probability of at least one success in the first access attempt increases with increasing N. This is true in spite of the fact that the collision rate increases with increasing N in the first access attempt for a given value of D. Since the probability of at least one success in the first access attempt is greater than 80% for D≧5 for all 2≦N≦10, the minimum delay remains approximately constant with increasing values of N, for all N>2.

Special Case of D*=N

Figure 12:
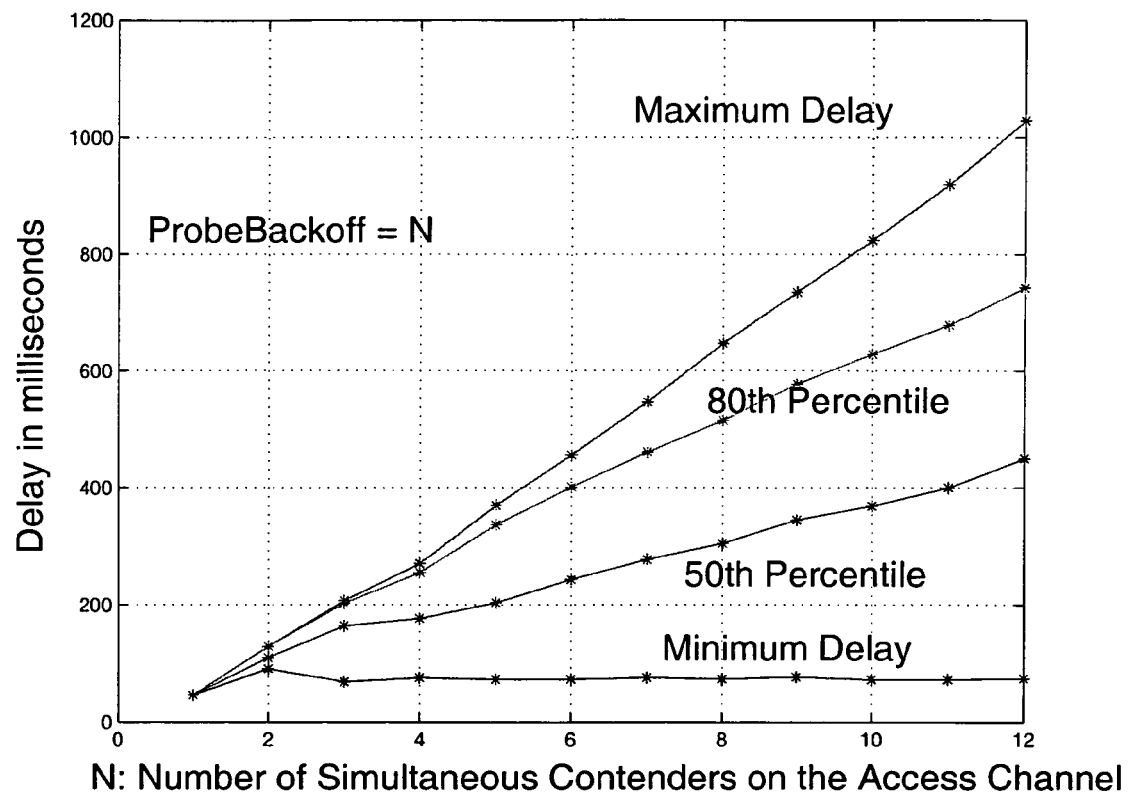
FIG. 12 is a graph of the number of simultaneous contenders on the Access Channel vs. delay for D=N.

Accordingly, we can consider the backoff interval D=N while maintaining all other parameters the same to provide optimal backoff settings for minimizing Minimum_Delay. FIG. 12 illustrates the various delay metrics as a function of N for the case when D=N. The Minimum_Delay curve is approximately constant for all values of N>2. For large values of N (e.g., N>3) assuming D=N, the probability of success of exactly one access probe at time t=0 is given by:

$$N\left(\frac{1}{N}\right)\left(1 - \frac{1}{N}\right)^{N-1} \approx \frac{1}{e} \forall N \geq 3.$$

The above probability is approximately 38% (since e=2.71) which is sufficiently high. In fact, a simple value for minimizing Minimum_Delay using a random backoff procedure can be to set D=N. This is explained in greater detail at the end of the Detailed Description. It can also be shown that the average number of successes in the initial [0, N−1] Access cycle durations starting from t=0 can be considered N/e=0.38N, when D=N.

As noted above, setting D=N is simple case that can be used effectively in embodiments of the invention. The case of D*=N is an interesting case because it tends to maximize the probability of success of exactly one access probe transmission in the earliest available transmission opportunity on the Access Channel on the first access attempt (i.e., at time t=0), which is given as:

$$D^* = \text{argmax}\left\{N\left(\frac{1}{D}\right)\left(1-\frac{1}{D}\right)^{N-1}\right\} = N.$$

The foregoing equation is explained in greater detail in At end of detailed description.

This guarantee makes this choice a rather attractive one. However there are two major disadvantages in setting $D^*=N$. First, for large values of N, setting D to N can result in a significant increase in the 95th percentile delay. Second, an improper estimation of N can result in a large increase in delay and can adversely affect performance.

In general, it can be seen that for large N (>5), the probability of at least one probe succeeding on the first access attempt was significantly high ($\geq 95\%$) for $D=5$. Therefore setting D to a value greater than 5 would generally not be desirable. The above algorithm can be stated as: $D^*=\min\{N, D_{max}\}$ where Dmax is a system-specific pre-determined value that upper-bounds the random backoff interval (e.g. Dmax=5). For low values of N, such a setting will result in a low 50th percentile delay.

Additionally, the probability of success of at least one access probe within K access cycle durations starting from $t=0$ is given by P(K) where $$P(K) \approx \frac{1}{e} + \left(\frac{e-1}{e}\right)\frac{1}{e} + \ldots \left(\frac{e-1}{e}\right)^{K-1}\frac{1}{e}$$

Figure 13A:
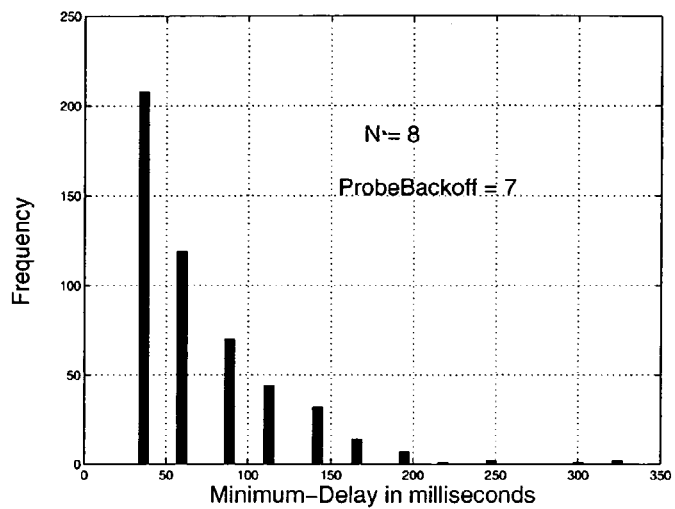
FIGS. 13A-C are graphs of the minimum delay, $50^{th}$ percentile delay, and maximum delay for various conditions.
Figure 13B:
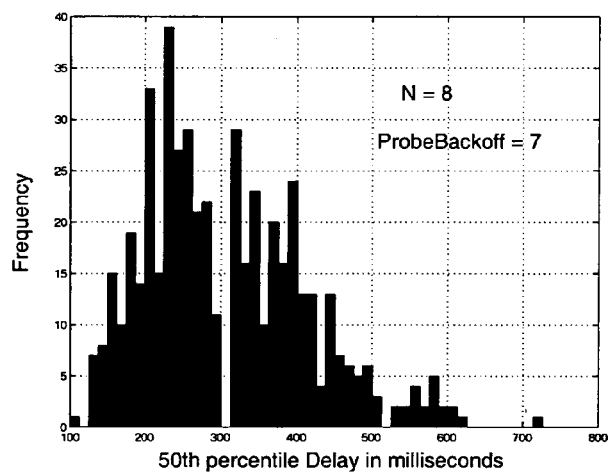
Figure 13C:
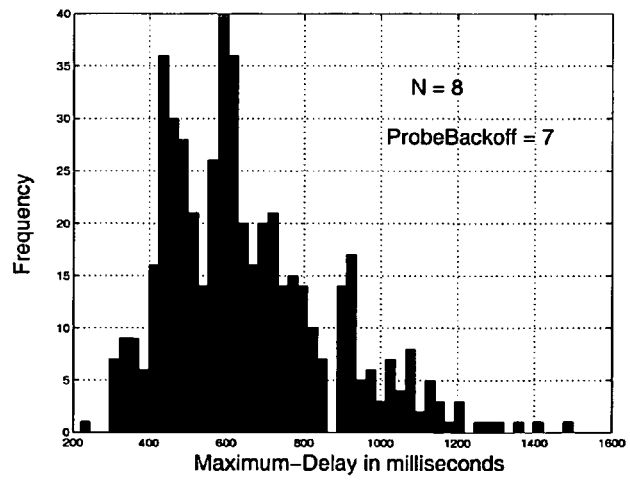

Accordingly, using the formula above, for K=3, P(3)=0.87 and for K=5, P(5)=0.95, which suggests that the probability of success of at least one access probe within 3~5 access cycle durations is relatively high. This can be verified by looking at the delay distribution for Minimum_Delay in FIG. 13A for the case when N=8 and D=8 (e.g., D=N). The distributions for the 50th percentile delay and Maximum_Delay are shown in FIGS. 13B and 13C, respectively.

A setting for D, according to one embodiment of the invention, was shown above to be equal to N. However, the value of N typically is not relayed to the access terminal in a direct manner. Accordingly, the value of N can be estimated so that an appropriate value of D can be set. However in estimating the value of N, the effect of the various delay metrics as a function of D for low and high values of N (e.g., N=4, 6 and 8) can be considered to guide the estimations. Setting D=N tends to minimize the average values of Minimum_Delay, 50th percentile delay as well as Maximum_Delay. Each of the delay metrics increases quickly when D is set to a value that is less than N as opposed to a value that is greater than N.

Accordingly, for large values of N, inaccuracy in estimating N does not lead to a significant increase in any of these delay metrics. For instance, if N was 8 in reality but was estimated inaccurately to some value in the range of 6 to 12 and the value of D was set to this estimated value, the (average) increase in Minimum_Delay as a result of this inaccurate estimate is at most 10 msec. The 50th percentile delay and Maximum_Delay are higher by at most 20 and 50 msec, respectively.

However, underestimating N by even a small amount, when N is small can result in a significant increase in all of the above delay metrics. This calls for a conservative approach to estimation of N when it is expected to be small (e.g., $N \leq 4$). Further, for small values of N (e.g., $2 \leq N \leq 4$) it may be adequate to assume to set D=3~4. The relative insensitivity in the delay metrics in spite of an inaccurate estimate of N for high values of N suggests that for large values of N, D could be set to a relatively small fixed value. For example for all $6 \leq N \leq 12$, D could be set to a fixed value such as 5 or 6.

Further, a minimum guarantee ($P_0$) on the probability of at least R successes in the first access attempt given N synchronized transmitters on the Access Channel can be used to determine the backoff interval D. Accordingly, the backoff interval D can be determined by computing the smallest D that solves the following inequality:

$$1 - \sum_{M=N-R+1}^{N} \sum_{k=1}^{\lfloor\frac{M}{2}\rfloor} P_K^M(N,D) \geq P_0.$$

The parameterized curves in FIGS. 10A and 10B and FIGS. 11A and 11B specify the L.H.S. expression for R=1 and 2 respectively for different values of N and D. Given $P_0$ and N, the backoff interval D can be determined by a simple lookup from these curves for different values of R. A similar QoS constraint can be applied to the delay experienced by access probes and this is considered in the following section.

Backoff Algorithm Based on Target Delay Guarantee

Given a delay constraint wherein the $Q^{th}$ percentile delay of successful transmission of K access probes out of a total of N access probes on the Access Channel must be no greater than Lmax, the smallest backoff interval can be determined as a function of N and Lmax by a simple table lookup whose entries, for example, can be generated by offline computations (simulations). For example, in the case of K=1, FIGS. 14A-C and plots the 50th, 85th and 95th (i.e. Q=50, 85, 95) percentile delay respectively of the first successful access probe. Given N, Q and Dmax, the value of D* for the case of K=1 can be determined as the smallest value of D such that the Qth percentile delay is greater than Lmax and this value can be stored in the form of a table at the access terminal (e.g., database 214).

Figure 14A:
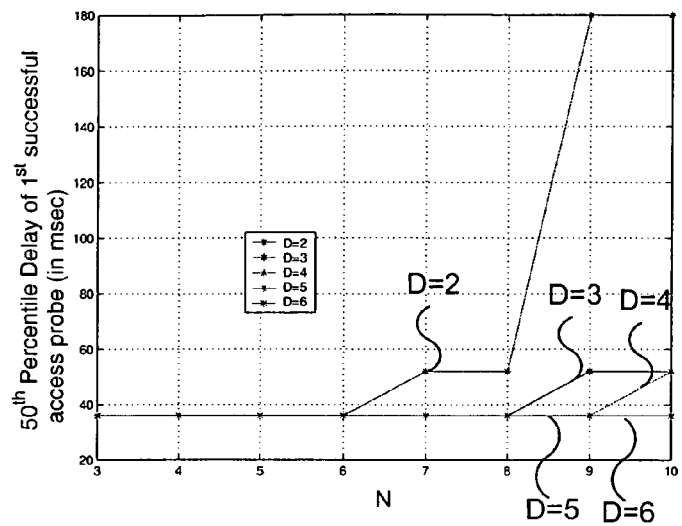
FIGS. 14A-C are graphs of the 50th, 85th, and 95th percentile of Minimum_Delay versus N for different values of D, respectively.
Figure 14B:
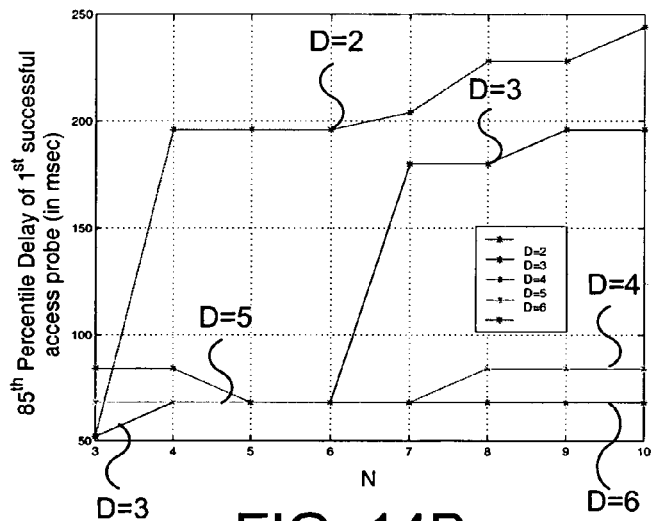
Figure 14C:
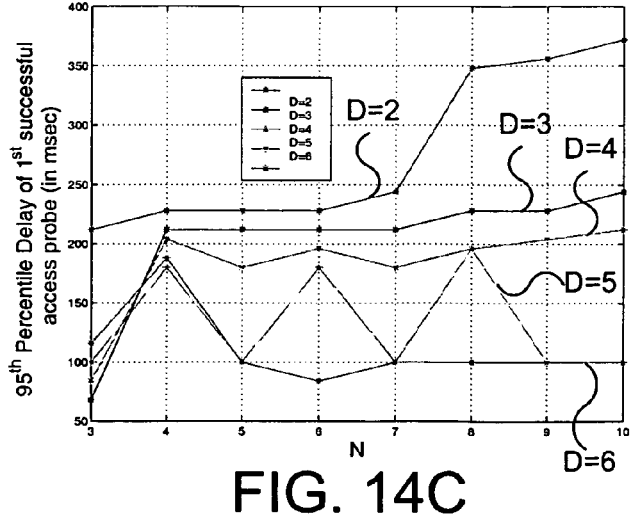

FIGS. 14A-14C illustrate the $50^{th}$, $85^{th}$, and $95^{th}$ percentile of Minimum_Delay versus N for different values of D, respectively. Similar curves can be generated for different values of Q and K via simulations and stored in the access terminal (e.g. as a table). Based on the value of N, Q and K a simple table lookup can be performed in order to determine an appropriate value D* prior to access probe transmission. Such a table may be stored in kernel memory or in application space. Generally, the Backoff algorithm, may be implemented in either space.

Accordingly in an embodiment of the invention, the backoff interval can be determined based on a delay constraint. The delay constraint can be determined as discussed above as a maximum delay (Lmax) for a given percentile (Q) of the successful transmission of K access probes out of a total of N simultaneous access probes on the access channel. The backoff interval (e.g., [0, D-1] can then be determined based on the values on N and Lmax (e.g., using the a table of via graphs as discussed above).

Incorporating Capture Effect of Access Probe Transmissions

As discussed above, the setting D*=N is an upper-bound for the case when the probability of decoding one access probe when more than one access probe is transmitted using the same PN code on the Access Channel. Denoting the probability of decoding one access probe when n access probes are transmitted over the Access Channel using the same PN code by $A_n$, the value D* can be determined as the solution to the following expression:

$$D^* = \text{argmax}\left\{\sum_{n=1}^{N} A_n \binom{N}{n}\left(\frac{1}{D}\right)^n\left(1-\frac{1}{D}\right)^{N-n}\right\}.$$

In experiments in a lab environment having an unloaded system, $A_n$ was observed to be equal to 1 for $N \leq 5$. For the special case of $A_n=1$ for all $1 \leq n \leq N$:

$$D^* = \text{argmax}\left\{1-\left(1-\frac{1}{D}\right)^N\right\} = 1.$$

However, in a real world deployed networks, it is very likely that $A_n<1$ and in this case $D^*>1$. In the worst case $A_n=0$ for all $N>1$.

Incorporating the Capture Effect of Access Probes in Computing the Backoff Interval.

The probability of capture of the strongest access probe when exactly two access probes are transmitted using the same CDMA PN code is ~75% when the RoT at the BTS is 5 dB. In a laboratory environment (e.g., QChat Multicast demo environment and an unloaded system), one access probe was decoded correctly even when five probes were transmitted at the same time. As illustrated by these experiments, it can be possible to decode an access probe even if more than one access probe is transmitted (i.e., in the presence of collisions). Accordingly, we can let the probability of decoding one access probe when $i_k$ probes are transmitted simultaneously using the same PN code be denoted by $Ai_k$. This probability can be known apriori from experimentation and simulation. Then, impact on computing the backoff interval can be determined as:

$$P_K^M(N,D) = \sum_{i_1,i_2,\ldots,i_K} \left\{ \frac{\frac{1}{K!}\frac{N!}{i_1!i_2!\ldots i_K!(N-M)!}}{\frac{D!}{(D-K-(N-M))!}\frac{1}{D^N}\prod_{k=1}^{K}(1-A_{i_k})} \right\}.$$

Using the above definition, the probability of at least R successes in the first access attempt can be easily computed and used w.l.o.g. (without loss of generality) directly in the Backoff algorithm in the section entitled "Backoff Algorithm Based on Target Success Probability of Access Probe(s)". Similarly, the parameterized curves generated in section entitled "Backoff Algorithm Based on Target Delay Guarantee" can be recomputed via simulations by taking into consideration the capture probabilities ($A_n$, where $1 \leq n \leq N$) as well. Generally, the capture effect can be considered as a weighting function to allow D to be adjusted based on the likelihood that a probe will be successfully received even in the event of a collision. That is, the value of D will tend to be increased as the probability of successfully receiving a probe even after a collision increases.

Those skilled in the art will appreciate from the foregoing disclosure that the value of the random backoff interval can affect the delay experienced by access probes over the Access Channel. It can also be appreciated that the value of the backoff interval should be generally set to a higher value when N is high and to a smaller value when N is low. By setting the backoff interval to [0, N−1], Access cycle durations can increase the probability of success of an access probe within the initial five access cycles to 95% (true for N>3). Such a setting may be appropriate for group communication systems (e.g., push-to-talk systems, QChat Group calls) as the Initial delay is typically determined by the arrival of the first ANNOUNCE_ACK. Therefore using the setting of D=N (or N−1) can yield optimal performance with regards to minimizing the Minimum_Delay as well the 50th percentile delay and Maximum_Delay, as discussed above, which can improve the initial delay. Further, according to embodiments of the invention, the random backoff procedure can be used prior to each access attempt. Still further, embodiments of the invention can be implemented at the access terminal either at the application layer or at the MAC layer.

Figure 15:
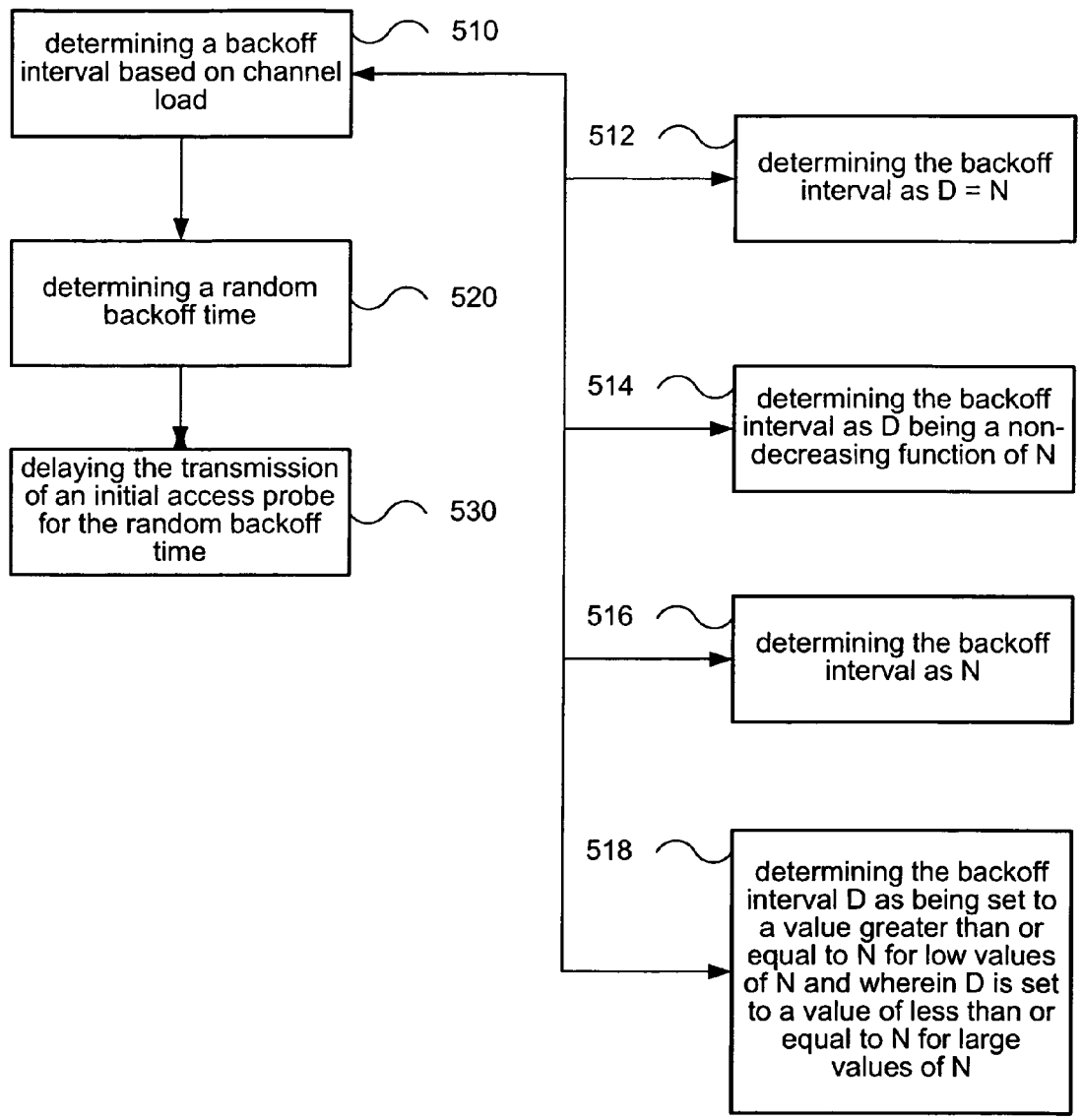
FIG. 15 is an illustration of methods in accordance with embodiments of the invention.

In view of the foregoing disclosure, those skilled in the art will recognize that embodiments of the invention include methods of performing the sequence of actions, operations and/or functions previously discussed. For example, as illustrated in FIG. 15, at least one embodiment includes a method comprising determining a backoff interval based on the channel load, 510, determining a random backoff time, 520 and delaying the transmission of an initial access probe for the random backoff time, 530. As discussed herein, by adding a random backoff time to the initial access probe transmission the probability of that the probe will be successfully received is greatly enhanced.

Additionally, as discussed herein, the backoff interval defines a range from which the random backoff time is selected. For example, the value D can be set equal to or approximately equal to N, block 512. As noted above, N is a number of access terminals (or can be considered access probes) attempting to access the Access Channel and D is used to establish an interval as [0, D−1*(Access cycles)] of the random backoff time. Alternatively, D can be considered to be a non-decreasing function of N, block 514. The term non-decreasing function of N represents that D can be loosely related to N, such that when N is large D is generally larger than D when N is small. However, this relationship is not limited to any specific ratios or factors and may include discontinuous regions. For example, D can be determined as being equal to N, or D can be set to a predetermined value based on a range of values of N (e.g., D=6 for $6 \leq N \leq 12$, or D=3 or 4 for $N \leq 4$). Still further, the backoff interval can be determined directly from N, (e.g., [0, N−1] Access cycles), block 516, wherein N is a number of access terminals attempting to access the Access Channel. In yet another aspect of the invention, D can be set to a value greater than or equal to N for low values of N and wherein D is set to a value of less than or equal to N for large values of N, block 518.

Other methods and variations of the foregoing illustration are readily available to the those skilled in the art for performing the sequence of actions, operations and/or functions previously discussed. Accordingly, the illustrated embodiments do not limit the invention. For example, the backoff interval can be determined based on a quality of service constraint, as discussed above. Therefore, the method can further include establishing a quality of service constraint, wherein the quality of service constraint is further used in determining the backoff interval. The quality of service constraint can be considered any function that determines a probability of success (P0) for a desired number of access probes (R). Accordingly, any of the previously described functions, algorithms, and/or methods for establishing the backoff interval and related backoff algorithms are within the scope of embodiments of the invention.

As discussed in the foregoing, embodiments of the invention can improve system latency which can benefit all applications but is particularly important to delay sensitive applications. A group communication system is an example of a delay sensitive system that can take advantage of reduced connection times offered by embodiments of the invention disclosed herein. The group communication system may also be known as a push-to-talk (PTT) system, a net broadcast service (NBS), a dispatch system, or a point-to-multi-point communication system. Typically, a group of access terminal users can communicate with one another using an access terminal assigned to each group member. The term "group member" denotes a group of access terminal users authorized to communicate with each other. Although, group communication systems/PTT systems may be considered to be among several members, the system is not limited to this configuration and can apply to communication between individual devices on a one to one basis.

The group may operate over an existing communications system, without requiring substantial changes to the existing infrastructure. Thus, a controller and users may operate in any system capable of transmitting and receiving packet information using Internet protocol (IP), such as a Code Division Multiple Access (CDMA) system, a Time Division Multiple Access (TDMA) system, a Global System for Mobile Communications (GSM) system, satellite communication systems, combinations of land line and wireless systems, and the like.

Group members may communicate with each other using an assigned access terminal, such as ATs 102, 108, and 112. The ATs may be wireline or wireless devices such as terrestrial wireless telephones, wireline telephones having push-to-talk capability, satellite telephones equipped with push-to-talk functionality, wireless video cameras, still cameras, audio devices such as music recorders or players, laptop or desktop computers, paging devices, or any combination thereof. Furthermore, each AT may be able to send and receive information in either a secure mode, or a non-secure (clear) mode. It should be understood that reference to an access terminal (AT) is not intended to be limited to the illustrated or enumerated examples, and may encompass other devices that have the capability to transmit and receive packet information in accordance with the Internet Protocol (IP).

When a group member wishes to transmit information to other members of the group, the member may request the transmission privilege by pressing a push-to-talk button or key on an AT, which generates a request formatted for transmission over a distributed network. For example, the request may be transmitted from AT 102 over the air to one or more MPTs (or base stations) 124. A MPC/MSC 122, which may include a well-known inter-working function (IWF), packet data serving node (PDSN), or packet control function (PCF), for processing data packets may exist between MPT/BS 124 and the distributed network RAN 120. However, the requests may also be transmitted through the public switched telephone network (PSTN) to a carrier network 126. The carrier network 126 may receive the request and provide it to distributed network 120.

Figure 16:
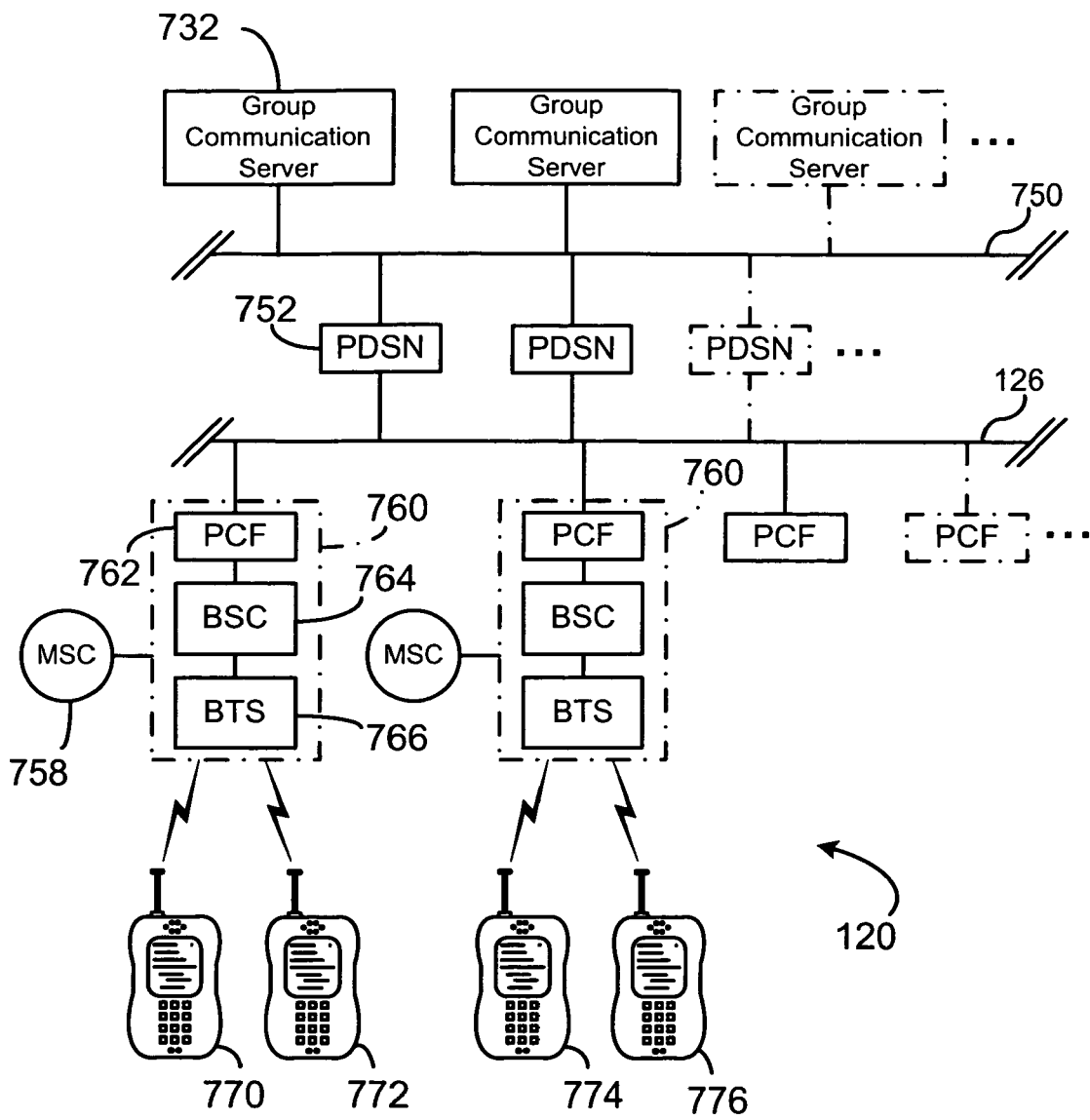
FIG. 16 is an illustration of a group communication system in accordance with embodiments of the invention.

Referring to FIG. 16, one or more group communication servers 732 can monitor traffic of the group communication system through its connection to distributed network 120. Since group communication server 432 can be connected to the network 120 through a variety of wired and wireless interfaces, geographic proximity to group participants is not necessary. Typically, a group communication server 732 controls communications between the access terminals/wireless devices of group members (ATs 770, 772, 774, 776) in a PTT system. The wireless network illustrated is merely exemplary and can include any system whereby remote modules communicate over-the-air between and among each other and/or between and among components of a wireless network including, without limitation, wireless network carriers and/or servers. A series of group communication servers 732 can be connected to a group communication server LAN 750.

The group communication server(s) 732 can be connected to a wireless service provider's packet data service node (PDSN) such as PSDN 752, shown here resident on a carrier network 126. Each PSDN 752 can interface with a base station controller 764 of a base station 760 through a packet control function (PCF) 762. The PCF 762 may be located in the base station 760. The carrier network 126 controls messages (generally in the form of data packets) sent to a MSC 758. The MSC 758 can be connected to one or more base stations 760. In a similar manner to the carrier network, the MSC 758 is typically connected to the BTS 766 by both the network and/or Internet for data transfer and PSTN for voice information. The BTS 766 ultimately broadcasts and receives messages wirelessly to and from the wireless ATs, such as cellular telephones 770, 772, 774, 776, as is well known in the art. Accordingly, the details of a group communication system will not be further discussed.

As discussed in the foregoing, group members (ATs 770, 772, 774, 776) can utilize embodiments of the invention to increase the probability of a successful first transmission of an access probe thereby reducing the PTT latency and improving the system performance. Accordingly, an embodiment of the invention can include an access terminal comprising: logic configured to determine a random backoff time; logic configured to delay the transmission of an initial access probe for the random backoff time; and logic configured to determine a backoff interval based on channel load, wherein the backoff interval defines a range from which the random backoff time is selected. Accordingly, logic in the access terminal can be configured to perform the functions, algorithms, equations, sequences and/or actions discussed herein.

Additionally, a server (e.g., the group communication server RAN or other network device) can work cooperatively with the access terminal to increase probability of a successful first transmission of an access probe. As used herein the term server is intended to be broadly construed as any device and/or combination of devices that are part of the wireless network or operably coupled to the wireless network that can perform the functions described herein Accordingly, in one embodiment of the invention, a server can transmit the number of participants in a group call (e.g., channel load estimate-potential N) as part of the Announce Message, initial message to the access terminal or initial page. Additionally, the message could be configured to list the number of access terminals in a sector/cell that are designated as part of the group call. For example, this configuration can be useful when a QChat group call (or similar group communication) is placed using the multicast option. In general this information can be exploited for all group calls.

Further, a server (e.g., RAN) can specify the total number of sectors in its paging zone to the access terminal. The access terminal can use this information to determine an estimate of N based on the number of pages (which can be considered to be proportional to the number of calls including both direct calls as well as group calls) it sees on a signaling or overhead channel (e.g., Control Channel) every paging cycle. If the server is configured to track the geographical location of access terminals at a finer granularity than a paging zone and transmit pages to a few sectors where the access terminal is most likely to be, then each access terminal can listen to pages on the Control Channel that are within its sector or in a neighboring sector. This can further enhance the ability to estimate the channel load (N), which in turn can enhance the ability of the access terminal to accurately establish the backoff interval.

Accordingly, an embodiment of the invention can include a communication system comprising: a server including logic configured to transmit a channel load estimate; and an access terminal including logic configured to receiving the channel load estimate; logic configured to determine a backoff interval based on the channel load estimate; logic configured to determine a random backoff time, wherein the backoff interval defines a range from which the random backoff time is selected; and logic configured to delay the transmission of an initial access probe for the random backoff time. As discussed above, the channel load estimate is a number of participants in a group call and can be transmitted in an initial communication from a server to an access terminal (e.g., in an Announce Message).

Further, embodiments of the invention can also include a method comprising transmitting a channel load estimate; receiving the channel load estimate; determining a backoff interval based on the channel load estimate; determining a random backoff time, wherein the backoff interval defines a range from which the random backoff time is selected; and delaying the transmission of an initial access probe for the random backoff time. Those skilled in the art will appreciate additional methods from the foregoing description. Accordingly, the invention is not limited to the itemized methods recited herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

Accordingly, an embodiment of the invention can include a computer readable media embodying methods in accordance with the methods, algorithms, steps and/or functions disclosed herein. For example, embodiments of the invention can include a computer readable media embodying a method in a wireless communication system, the method comprising: determining a backoff interval based on channel load; determining a random backoff time, wherein the backoff interval defines a range from which the random backoff time is selected; and delaying the transmission of an initial access probe for the random backoff time. Further, the computer readable media can embody a method further comprising: determining the backoff interval based on a channel load estimate received from a server.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

Derivation of Access Channel Collision Probability

Let us denote the probability of M probes colliding in exactly K collision events by $P_K^M(N,D)$. Let the number of probes colliding in each of these K collision events be given by $I=\{i_1, i_2, \ldots i_K\}$, where $i_1+i_2+\ldots i_K=M$. Then, $$P_K^M(N, D) = \sum_{i_1, i_2, \ldots i_K} \frac{M!}{i_1! i_2! \ldots i_K!} \frac{1}{D^M}$$

$$\frac{N!}{M!(N-M)!} \frac{D!}{K!(D-K)!} \left\{ \frac{(D-K)!}{(D-K-(N-M))!} \frac{1}{D^{N-M}} \right\}$$

The derivation of the above expression is broken down into steps:

The term $$\frac{D!}{K!(D-K)!}$$

is the number of possible selections of K slots out of a total of D slots in which a collision event takes place.

$$\frac{N!}{M!(N-M)!}$$

is the number of possible selections of M mobiles that collide out of N mobiles.
The term $$\frac{M!}{i_1!i_2!\ldots i_K!}\frac{1}{D^{i_1+i_2+\ldots+i_K}}$$

denotes the probability that out of M mobiles, $i_1$ mobiles start transmitting at the same time, $i_2$ mobiles start transmitting at the same time and so on.
The term $$\left\{\frac{(D-K)!}{(D-K-(N-M))!}\frac{1}{D^{N-M}}\right\}$$

denotes the probability that no TWO of remaining N–M mobiles collide in the remaining D–K slots.
For a collision to take place in a slot, at least two probes must transmit simultaneously. Therefore, $i_k \geq 2$ for all k=[1, K]. This means $$K \leq \left\lfloor \frac{M}{2} \right\rfloor.$$

The number of terms in the summation on the R.H.S is equal to the number of possible solutions to the equation $$i_1+i_2+\ldots i_K=M \text{ subject to } 2 \leq i_j \leq \lfloor M/2 \rfloor.$$

Solutions $\vec{I}_a = \{i_1^a, i_2^a, \ldots i_K^a\}$ and $\vec{I}_b = \{i_1^b, i_2^b, \ldots i_K^b\}$ to the above equation are defined to be separable if $\vec{I}_b$ cannot be generated by any reordering (permutation) of the components of $\vec{I}_a$. Corresponding to each separable solution $\vec{I}$, there are $C(\vec{I})$ permutations of the components in $\vec{I}$ that are also solutions to the above equation. Specifically, $$C(\vec{I}) = \frac{K!}{M_1!M_1!\ldots M_J!}$$

where the solution $\{i_1, i_2, \ldots i_K\}$ has J distinct integer values and $M_j$ denotes the number of elements in $\{i_1, i_2, \ldots i_K\}$ that are equal to j where $\min_{1 \leq k \leq K} i_k \leq j \leq \max_{1 \leq k \leq K} i_k$. Therefore, the collision probability can be expressed as:

$$P_K^M(N, D) = \sum_{\text{separable solutions } \vec{I}} C(\vec{I}) \frac{1}{K!} \frac{N!}{i_1!i_2!\ldots i_K!(N-M)!} \frac{D!}{(D-K-(N-M))!} \frac{1}{D^N}.$$

Proof of Optimality of D*=N in Maximizing the Probability of Success of an Access Probe at t=0
Consider the function $g(p)=Np(1-p)^{N-1}$ where p is the probability of transmission of an access probe in a slot. The maximum value of g(p) is achieved at $$p = \frac{1}{N}.$$

This is because of the following reasons:
In the interval $$1 \leq p \leq \frac{2}{N},$$

g(p) is concave in p since $$\frac{\partial^2 g(p)}{\partial p^2} \leq 0.$$

Therefore, the maximum value of g(p) in the interval $$1 \leq p \leq \frac{2}{N}$$

can be simply determined by setting the first derivative to zero. i.e., $$\frac{\partial g(p)}{\partial p} = N(1-p)^{N-2}\{1-p-(N-1)p\} = 0 \text{ which yields } p = \frac{1}{N}.$$

In the interval $$0 \geq p \geq \frac{2}{N}$$

, g(p) is convex in p since $$\frac{\partial^2 g(p)}{\partial p^2} > 0.$$

Therefore, the maximum value of g(p) in the interval $$0 \geq p \geq \frac{2}{N}$$

is either at p=0 or $$p = \frac{2}{N}.$$

Clearly p=0 is not the maximizer as g(0)=0. Also, $$p = \frac{2}{N}$$

does not maximize g(p) as it was shown earlier that $$p = \frac{1}{N}$$

maximizes g(p) in the interval $$1 \le p \le \frac{2}{N}.$$

Therefore $$p = \frac{1}{N}$$

is the unique maximizer of g(p).

Access probes transmissions perform a random back-off procedure in the interval [0, D−1]. Therefore, $$p = \frac{1}{D}$$

by definition. Therefore, setting D=N maximizes the probability of successful transmission in a slot. In fact, the probability of at least ONE success in the interval [0, K] Access cycle durations when access probes are transmitted with probability p is given by:

$$P_r(p, K) = \sum_{k=1}^{K-1} (1 - g(p))^{k-1} g(p) = 1 - (1 - g(p))^K.$$

Since for any given K, Pr(p, K) in increasing in g(p), the probability Pr(p, K) is maximized at $$p = p^* = \frac{1}{N}.$$

In other words, D=N is the optimal setting for maximizing the probability of at least ONE success in the 1$^{st}$ access attempt. It is interesting to note that, $$g(p^*) = g\left(\frac{1}{D}\right) = g\left(\frac{1}{N}\right) \approx \frac{1}{e} \text{ for all } N \ge 4.$$

This suggests that the probability of success in the 1$^{st}$ access attempt is always a constant as long as D=N. This property has been verified via simulations.

$$D^* = \arg\max \left\{ 1 - \sum_{M=2}^{N-1} \sum_{K=1}^{\lfloor \frac{M}{2} \rfloor} P_K^M(N, D) \right\}.$$

What is claimed is:

1. A method comprising:
    determining a backoff interval based an estimate of a number of access terminals (N) attempting to access an access channel;
    determining a random backoff time, wherein the backoff interval defines a range from which the random backoff time is selected;
    randomly selecting the random backoff time from the backoff interval of [0, D−1]*Tac, wherein D is an integer and Tac is approximately one access cycle; and
    delaying transmission of an initial access probe for the random backoff time, wherein D is a non-decreasing function of N, and wherein D is equal to N for N less than a predetermined value and wherein D is equal to the predetermined value for N greater than or equal to the predetermined value.

2. A method comprising:
    determining a backoff interval based an estimate of a number of access terminals (N) attempting to access an access channel;
    determining a random backoff time, wherein the backoff interval defines a range from which the random backoff time is selected;
    randomly selecting the random backoff time from the backoff interval of [0, D−1]*Tac, wherein D is an integer and Tac is approximately one access cycle; and
    delaying transmission of an initial access probe for the random backoff time, wherein D is a non-decreasing function of N, and wherein D is set to a value greater than or equal to N for low values of N and wherein D is set to a value of less than or equal to N for large values of N.

3. A method comprising:
    determining a backoff interval based an estimate of a number of access terminals (N) attempting to access an access channel;
    establishing a quality of service constraint, wherein the quality of service constraint is further used in determining the backoff interval;
    determining a random backoff time, wherein the backoff interval defines a range from which the random backoff time is selected;
    establishing a delay constraint as a maximum delay (Lmax) for a given percentile (Q) of the successful transmission of K access probes out of a total of N simultaneous access probes on the access channel, wherein the quality of service constraint is based on the delay constraint, and
    delaying transmission of an initial access probe for the random backoff time.

4. The method of claim 3, wherein the quality of service constraint is a probability of success ($P_0$) for a desired number of access probes (R).

5. The method of claim 4, wherein the backoff interval is determined from a curve based on $P_0$ and N.

6. The method of claim 3, further comprising:
    determining the backoff interval based on values of N and Lmax.

7. The method of claim 3, wherein the backoff interval is adjusted to compensate for a capture effect in a wireless network.

8. The method of claim 7, wherein the capture effect acts as a weighting function to allow the backoff interval to be adjusted based on the likelihood that a probe will be successfully received even in an event of a collision.

9. The method of claim 3, further comprising:
determining the backoff interval based on an estimate of N received from a server.

10. A method comprising:
determining a backoff interval based an estimate of a number of access terminals (N) attempting to access an access channel;
establishing a quality of service constraint, wherein the quality of service constraint is further used in determining the backoff interval;
determining a random backoff time, wherein the backoff interval defines a range from which the random backoff time is selected; and
delaying transmission of an initial access probe for the random backoff time, wherein the quality of service constraint is defined as:

$$1 - \sum_{M=N-R+1}^{N} \sum_{K=1}^{\lfloor \frac{M}{2} \rfloor} P_K^M(N, D) \geq P_0.$$

where $P_0$ is a probability of success, R is a number of successful access probes, and K denotes a number of access cycle durations in which a collision event takes place when N access probes contend to transmit over the access channel and where $P_K^M(N, D)$ denotes a probability of M probes colliding in K collision events when N access probes begin access procedures at the same time and delay probe transmission by a random amount of time (in an interval [0, D−1] Access Cycle durations) prior to a first access attempt.

11. A method comprising:
determining a backoff interval based an estimate of a number of access terminals (N) attempting to access an access channel;
determining a random backoff time, wherein the backoff interval defines a range from which the random backoff time is selected;
randomly selecting the random backoff time from the backoff interval of [0, D−1]*Tac, wherein D is an integer and Tac is approximately one access cycle; and
delaying transmission of an initial access probe for the random backoff time, wherein the backoff interval is adjusted to compensate for a capture effect in a wireless network, wherein the capture effect acts as a weighting function to allow the backoff interval to be adjusted based on a likelihood that a probe will be successfully received even in an event of a collision and wherein the capture effect is determined as:

$$P_K^M(N, D) = \sum_{i_1, i_2, \ldots, i_K} \left\{ \frac{1}{K!} \frac{N!}{i_1! i_2! \ldots i_K!(N-M)!} \frac{D!}{(D-K-(N-M))!} \prod_{k=1}^{K}(1 - A_{i_k}) \right\}.$$

where $A_{i_k}$ is a probability of decoding one access probe when $i_k$ probes are transmitted simultaneously using the same PN code, and where $P_K^M(N, D)$ denotes the probability of M probes colliding in K collision events when N access probes begin access procedures at the same time and defer their probe transmission by a random amount of time (in an interval [0, D−1] Access Cycle durations) prior to the first access attempt.

12. An apparatus comprising:
logic configured to determine a random backoff time;
logic configured to determine a backoff interval based on an estimate of a number of access terminals (N) attempting to access an access channel, wherein the backoff interval defines a range from which the random backoff time is selected;
logic configured to randomly select the random backoff time from the backoff interval of [0, D−1]*Tac, wherein D is an integer and Tac is approximately one access cycle; and
logic configured to delay transmission of an initial access probe for the random backoff time, wherein D is set to a value greater than or equal to N for low values of N and wherein D is set to a value of less than or equal to N for large values of N.

13. The apparatus of claim 12, wherein D is a non-decreasing function of N.

14. The apparatus of claim 12, further comprising:
logic configured to determine the backoff interval based on a channel load estimate received from a server.

15. An apparatus comprising:
logic configured to determine a random backoff time;I
logic configured to determine a backoff interval based on an estimate of a number of access terminals (N) attempting to access an access channel, wherein the backoff interval defines a range from which the random backoff time is selected;
logic configured to randomly select the random backoff time from the backoff interval of [0, D−1]*Tac, wherein D is an integer and Tac is approximately one access cycle; and
logic configured to delay transmission of an initial access probe for the random backoff time, wherein D is set to a predetermined value for a range of N.

16. An apparatus comprising:
logic configured to determine a random backoff time;
logic configured to determine a backoff interval based on an estimate of a number of access terminals (N) attempting to access an access channel, wherein the backoff interval defines a range from which the random backoff time is selected;
logic configured to establish a quality of service constraint, wherein the quality of service constraint is further used in determining the backoff interval;
logic configured to establish a delay constraint as a maximum delay (Lmax) for a given percentile (Q) of the successful transmission of K access probes out of a total of N simultaneous access probes on the access channel, wherein the quality of service constraint is based on the delay constraint; and
logic configured to delay transmission of an initial access probe for the random backoff time.

17. The apparatus of claim 16, wherein the quality of service constraint is a probability of success ($P_0$) for a desired number of access probes (R).

18. The apparatus of claim 17, wherein the backoff interval is determined from a curve based on $P_0$ and N.

19. An apparatus comprising:
logic configured to determine a random backoff time;
logic configured to determine a backoff interval based on an estimate of a number of access terminals (N) attempting to access an access channel, wherein the backoff interval defines a range from which the random backoff time is selected;

logic configured to establish a quality of service constraint, wherein the quality of service constraint is further used in determining the backoff interval; and logic configured to delay transmission of an initial access probe for the random backoff time, wherein the quality of service constraint is defined as:

$$1 - \sum_{M=N-R+1}^{N} \sum_{K=1}^{\lfloor \frac{M}{2} \rfloor} P_K^M(N, D) \geq P_0.$$

where $P_0$ is a probability of success, R is a number of successful access probes, and K denotes a number of access cycle durations in which a collision event takes place when N access probes contend to transmit over the access channel.

20. An access terminal comprising:
means for determining a backoff interval based on an estimate of a number of access terminals (N) attempting to access an access channel;
means for determining a random backoff time, wherein the backoff interval defines a range from which the random backoff time is selected;
means for randomly selecting the random backoff time from the backoff interval of [0, D−1]*Tac, wherein D is an integer and Tac is approximately one access cycle; and
means for delaying transmission of an initial access probe for the random backoff time, wherein D is set to a value greater than or equal to N for low values of N and wherein D is set to a value of less than or equal to N for large values of N.

21. The access terminal of claim 20, further comprising:
means for establishing a quality of service constraint, wherein the quality of service constraint is further used in determining the backoff interval.

22. The access terminal of claim 20, further comprising:
means for determining the backoff interval based on an estimate of N being received from a server.

23. A non-transitory computer readable medium embodying a method for execution by a processor in a wireless communication system, the method comprising:
determining a backoff interval based on channel load of an access channel;
determining a random backoff time, wherein the backoff interval defines a range from which the random backoff time is selected;
randomly selecting the random backoff time from the backoff interval of [0, D−1]*Tac, wherein D is an integer and Tac is approximately one access cycle; and
delaying transmission of an initial access probe for the random backoff time, wherein D is set to a value greater than or equal to N for low values of N and wherein D is set to a value of less than or equal to N for large values of N.

24. The non-transitory computer readable medium embodying the method of claim 23 further comprising:
determining the backoff interval based on a channel load estimate received from a server.

* * * * *